(12) United States Patent
Lee et al.

(10) Patent No.: US 12,464,546 B2
(45) Date of Patent: Nov. 4, 2025

(54) METHOD AND DEVICE FOR REQUESTING TRANSMISSION RESOURCE FOR RELAY IN NR V2X

(71) Applicant: LG ELECTRONICS INC., Seoul (KR)

(72) Inventors: Jongyoul Lee, Seoul (KR); Seoyoung Back, Seoul (KR); Giwon Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 519 days.

(21) Appl. No.: 17/916,455

(22) PCT Filed: Jul. 8, 2020

(86) PCT No.: PCT/KR2020/008895
§ 371 (c)(1),
(2) Date: Sep. 30, 2022

(87) PCT Pub. No.: WO2021/201341
PCT Pub. Date: Oct. 7, 2021

(65) Prior Publication Data
US 2023/0146227 A1    May 11, 2023

(30) Foreign Application Priority Data
Apr. 2, 2020  (KR) .................. 10-2020-0040185

(51) Int. Cl.
*H04W 72/40* (2023.01)
*H04W 28/02* (2009.01)
(Continued)

(52) U.S. Cl.
CPC ....... *H04W 72/40* (2023.01); *H04W 28/0278* (2013.01); *H04W 72/25* (2023.01); *H04W 72/566* (2023.01)

(58) Field of Classification Search
None
See application file for complete search history.

(56) References Cited

U.S. PATENT DOCUMENTS

| | | | | |
|---|---|---|---|---|
| 2008/0316959 | A1* | 12/2008 | Bachl | H04W 72/21 370/329 |
| 2015/0117342 | A1* | 4/2015 | Loehr | H04L 1/1874 370/329 |

(Continued)

FOREIGN PATENT DOCUMENTS

KR    10-2018-0030125 A    3/2018

OTHER PUBLICATIONS

Huawei, (2016), "Discussion on Multiple Relay UE IDs for a Relay UE", R2-161072, 3GPP TSG-RAN WG2 Meeting #93, Malta, See Section 3.

(Continued)

*Primary Examiner* — Hassan A Phillips
*Assistant Examiner* — Gautam Sharma
(74) *Attorney, Agent, or Firm* — BRYAN CAVE LEIGHTON PAISNER LLP

(57) ABSTRACT

Provided are a method for performing wireless communication by a first device and a device supporting same. The method may comprise the steps of: receiving, from a second device, a first physical sidelink control channel (PSCCH) and a first physical sidelink shared channel (PSSCH) associated with the first PSCCH; receiving, from a third device, a second PSCCH and a second PSSCH associated with the second PSCCH; storing data received over the first PSSCH in a first buffer; storing data received over the second PSSCH in a second buffer; transmitting, to a base station, a scheduling request (SR) and/or a buffer status report (BSR) associated with the first buffer, on the basis that available data is in the first buffer; receiving information associated with a first resource from the base station as a response to the (Continued)

SR and/or BSR associated with the first buffer; and transmitting the data on the first buffer to a fourth device by means of the first resource.

15 Claims, 25 Drawing Sheets

(51) Int. Cl.
*H04W 72/25* (2023.01)
*H04W 72/566* (2023.01)

(56) References Cited

U.S. PATENT DOCUMENTS

| | | | | |
|---|---|---|---|---|
| 2018/0007529 | A1* | 1/2018 | Shin | H04W 48/17 |
| 2018/0035354 | A1* | 2/2018 | Martin | H04W 40/12 |
| 2018/0054237 | A1* | 2/2018 | Tseng | H04W 36/0022 |
| 2018/0054755 | A1* | 2/2018 | Lee | H04W 72/21 |
| 2018/0077746 | A1* | 3/2018 | Lee | H04L 5/006 |
| 2018/0213379 | A1* | 7/2018 | Xiong | H04W 4/70 |
| 2018/0235027 | A1 | 8/2018 | Adachi et al. | |
| 2019/0306835 | A1* | 10/2019 | Hoang | H04W 72/53 |
| 2019/0335356 | A1* | 10/2019 | Lee | H04W 28/0278 |
| 2020/0092685 | A1* | 3/2020 | Fehrenbach | H04W 36/08 |
| 2020/0163005 | A1* | 5/2020 | Rao | H04W 4/44 |
| 2020/0296738 | A1* | 9/2020 | Inokuchi | H04W 72/21 |
| 2020/0314727 | A1* | 10/2020 | Xu | H04L 47/32 |
| 2021/0168832 | A1* | 6/2021 | Zhuo | H04W 72/23 |
| 2022/0086871 | A1* | 3/2022 | Lu | H04W 72/21 |
| 2023/0146227 | A1* | 5/2023 | Lee | H04W 72/25 |
| | | | | 370/329 |

OTHER PUBLICATIONS

Ericsson, "Relaying Scenarios with multiple UEs", 3GPP TSG-RAN WG2 #95bis, Tdoc R2-166728, Kaohsiung, Taiwan, Oct. 10-14, 20216.

* cited by examiner (a)

(b)

(a)

(b)

METHOD AND DEVICE FOR REQUESTING TRANSMISSION RESOURCE FOR RELAY IN NR V2X

CROSS-REFERENCE TO RELATED APPLICATIONS

This application is the National Stage filing under 35 U.S.C. § 371 of International Application No PCT/KR2020/008895, filed on Jul. 8, 2020, which claims the benefit of Korean Patent Application No. 10-2020-0040185, filed on Apr. 2, 2020, the contents of which are all hereby incorporated by reference herein in their entirety.

BACKGROUND OF THE DISCLOSURE

Field of the Disclosure

This disclosure relates to a wireless communication system.

Related Art

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic.

Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

FIG. 1 is a drawing for describing V2X communication based on NR, compared to V2X communication based on RAT used before NR. The embodiment of FIG. 1 may be combined with various embodiments of the present disclosure.

Regarding V2X communication, a scheme of providing a safety service, based on a V2X message such as Basic Safety Message (BSM), Cooperative Awareness Message (CAM), and Decentralized Environmental Notification Message (DENM) is focused in the discussion on the RAT used before the NR. The V2X message may include position information, dynamic information, attribute information, or the like. For example, a UE may transmit a periodic message type CAM and/or an event triggered message type DENM to another UE.

For example, the CAM may include dynamic state information of the vehicle such as direction and speed, static data of the vehicle such as a size, and basic vehicle information such as an exterior illumination state, route details, or the like. For example, the UE may broadcast the CAM, and latency of the CAM may be less than 100 ms. For example, the UE may generate the DENM and transmit it to another UE in an unexpected situation such as a vehicle breakdown, accident, or the like. For example, all vehicles within a transmission range of the UE may receive the CAM and/or the DENM. In this case, the DENM may have a higher priority than the CAM.

Thereafter, regarding V2X communication, various V2X scenarios are proposed in NR. For example, the various V2X scenarios may include vehicle platooning, advanced driving, extended sensors, remote driving, or the like.

For example, based on the vehicle platooning, vehicles may move together by dynamically forming a group. For example, in order to perform platoon operations based on the vehicle platooning, the vehicles belonging to the group may receive periodic data from a leading vehicle. For example, the vehicles belonging to the group may decrease or increase an interval between the vehicles by using the periodic data.

For example, based on the advanced driving, the vehicle may be semi-automated or fully automated. For example, each vehicle may adjust trajectories or maneuvers, based on data obtained from a local sensor of a proximity vehicle and/or a proximity logical entity. In addition, for example, each vehicle may share driving intention with proximity vehicles.

For example, based on the extended sensors, raw data, processed data, or live video data obtained through the local sensors may be exchanged between a vehicle, a logical entity, a UE of pedestrians, and/or a V2X application server. Therefore, for example, the vehicle may recognize a more improved environment than an environment in which a self-sensor is used for detection.

For example, based on the remote driving, for a person who cannot drive or a remote vehicle in a dangerous environment, a remote driver or a V2X application may operate or control the remote vehicle. For example, if a route is predictable such as public transportation, cloud computing based driving may be used for the operation or control of the remote vehicle. In addition, for example, an access for a cloud-based back-end service platform may be considered for the remote driving.

Meanwhile, a scheme of specifying service requirements for various V2X scenarios such as vehicle platooning, advanced driving, extended sensors, remote driving, or the like is discussed in NR-based V2X communication.

SUMMARY OF THE DISCLOSURE

Technical Objects

Meanwhile, in the future sidelink, V2X communication through a relay may be supported. In the past, technologies for supporting NR-based V2X-related road safety services have been developed. On the other hand, in order to support various applications and services and extent a coverage and/or increase power efficiency of sidelink and/or a network (NW) in in-coverage or out-coverage, sidelink communication through a relay needs to be supported.

Technical Solutions

In one embodiment, provided is a method for performing wireless communication by a first device. The method may comprise: receiving, from a second device, a first physical sidelink control channel (PSCCH) and a first physical sidelink shared channel (PSSCH) related to the first PSCCH; receiving, from a third device, a second PSCCH and a second PSSCH related to the second PSCCH; storing data received through the first PSSCH in a first buffer; storing data received through the second PSSCH in a second buffer; transmitting, to a base station, at least one of a scheduling request (SR) or a buffer status report (BSR) related to the first buffer, based on available data in the first buffer; receiving, from the base station, information related to a first resource in response to at least one of the SR or the BSR related to the first buffer; and transmitting, to a fourth device, data in the first buffer by using the first resource.

In one embodiment, provided is a first device adapted to perform wireless communication. The first device may comprise: one or more memories storing instructions; one or more transceivers; and one or more processors connected to the one or more memories and the one or more transceivers. The one or more processors may execute the instructions to: receive, from a second device, a first physical sidelink control channel (PSCCH) and a first physical sidelink shared channel (PSSCH) related to the first PSCCH; receive, from a third device, a second PSCCH and a second PSSCH related to the second PSCCH; store data received through the first PSSCH in a first buffer; store data received through the second PSSCH in a second buffer; transmit, to a base station, at least one of a scheduling request (SR) or a buffer status report (BSR) related to the first buffer, based on available data in the first buffer; receive, from the base station, information related to a first resource in response to at least one of the SR or the BSR related to the first buffer; and transmit, to a fourth device, data in the first buffer by using the first resource.

Effects of the Disclosure

The user equipment (UE) may efficiently relay data.

DESCRIPTION OF EXEMPLARY EMBODIMENTS

Figure 1:
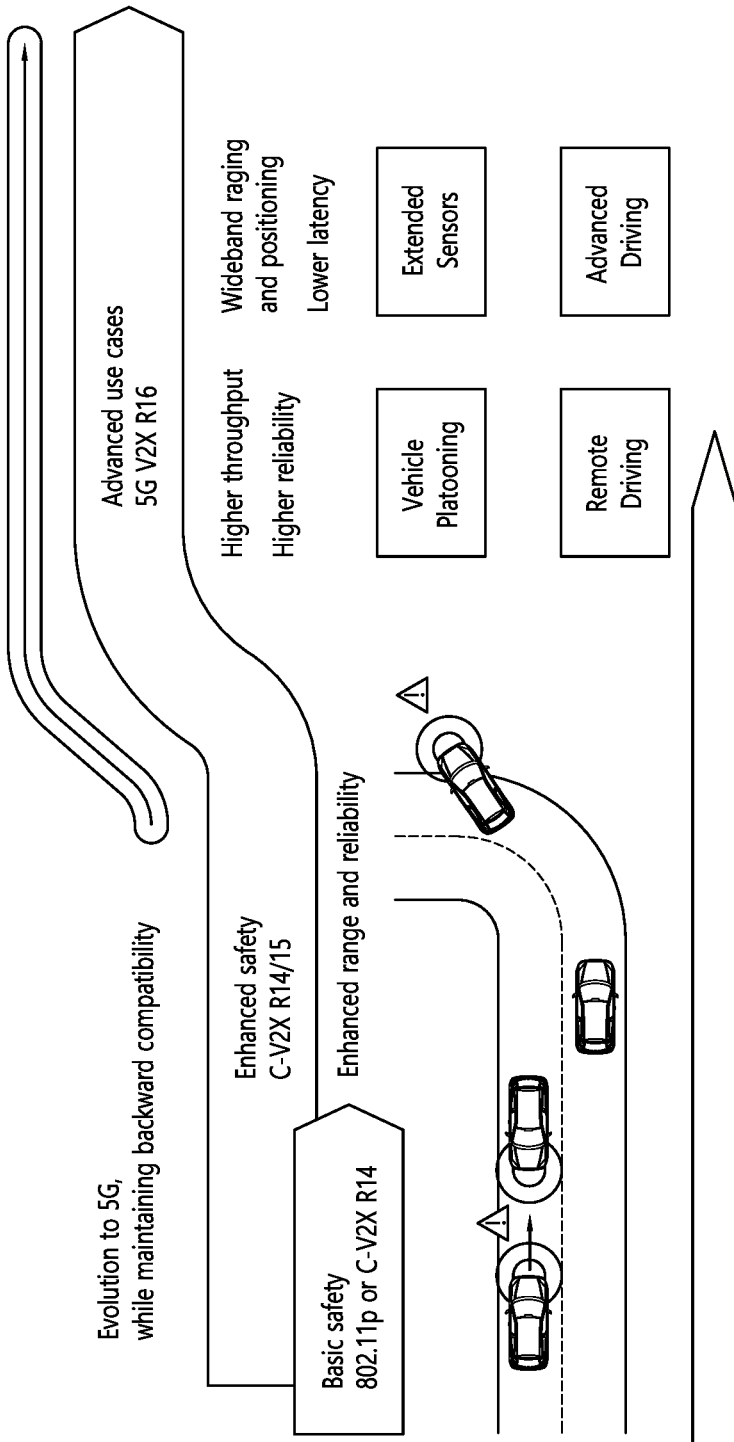
FIG. 1 is a drawing for describing V2X communication based on NR, compared to V2X communication based on RAT used before NR.

In the present disclosure, "A or B" may mean "only A", "only B" or "both A and B." In other words, in the present disclosure, "A or B" may be interpreted as "A and/or B". For example, in the present disclosure, "A, B, or C" may mean "only A", "only B", "only C", or "any combination of A, B, C".

A slash (/) or comma used in the present disclosure may mean "and/or". For example, "A/B" may mean "A and/or B". Accordingly, "A/B" may mean "only A", "only B", or "both A and B". For example, "A, B, C" may mean "A, B, or C".

In the present disclosure, "at least one of A and B" may mean "only A", "only B", or "both A and B". In addition, in the present disclosure, the expression "at least one of A or B" or "at least one of A and/or B" may be interpreted as "at least one of A and B".

In addition, in the present disclosure, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present disclosure may mean "for example". Specifically, when indicated as "control information (PDCCH)", it may mean that "PDCCH" is proposed as an example of the "control information". In other words, the "control information" of the present disclosure is not limited to "PDCCH", and "PDCCH" may be proposed as an example of the "control information". In addition, when indicated as "control information (i.e., PDCCH)", it may also mean that "PDCCH" is proposed as an example of the "control information".

A technical feature described individually in one figure in the present disclosure may be individually implemented, or may be simultaneously implemented.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

Figure 2:
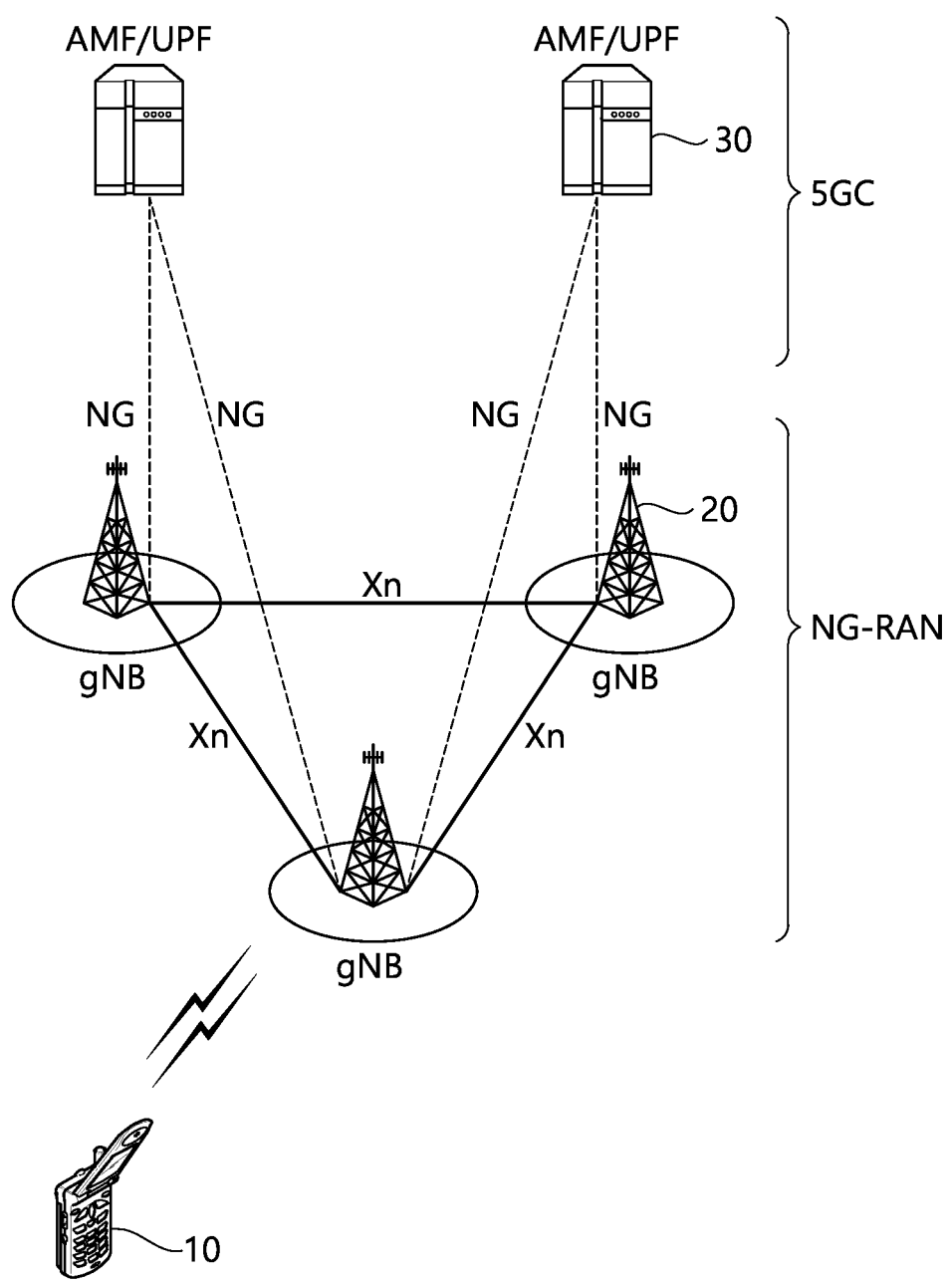
FIG. 2 shows a structure of an NR system, based on an embodiment of the present disclosure.

FIG. 2 shows a structure of an NR system, based on an embodiment of the present disclosure. The embodiment of FIG. 2 may be combined with various embodiments of the present disclosure.

Referring to FIG. 2, a next generation—radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 2 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Figure 3:
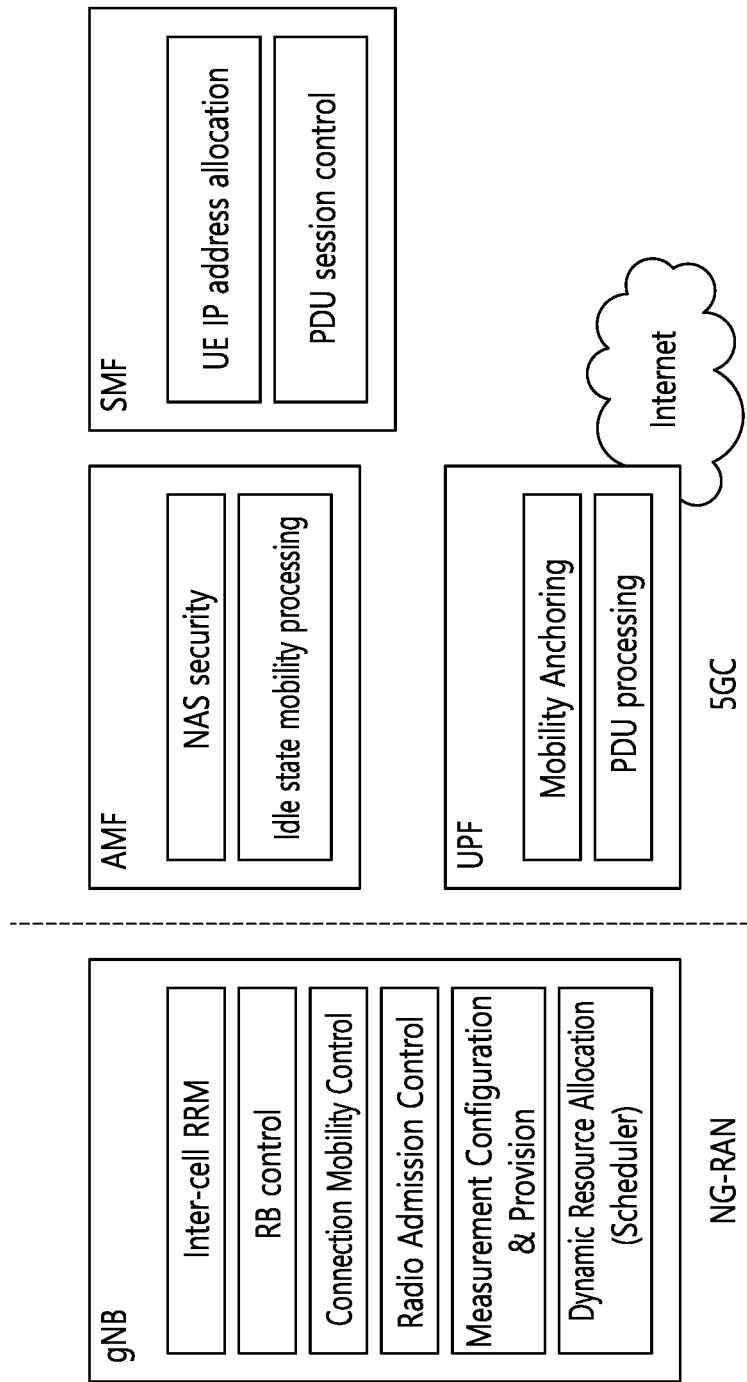
FIG. 3 shows a functional division between an NG-RAN and a 5GC, based on an embodiment of the present disclosure.

FIG. 3 shows a functional division between an NG-RAN and a 5GC, based on an embodiment of the present disclosure. The embodiment of FIG. 3 may be combined with various embodiments of the present disclosure.

Referring to FIG. 3, the gNB may provide functions, such as Inter Cell Radio Resource Management (RRM), Radio Bearer (RB) control, Connection Mobility Control, Radio Admission Control, Measurement Configuration & Provision, Dynamic Resource Allocation, and so on. An AMF may provide functions, such as Non Access Stratum (NAS) security, idle state mobility processing, and so on. A UPF may provide functions, such as Mobility Anchoring, Protocol Data Unit (PDU) processing, and so on. A Session Management Function (SMF) may provide functions, such as user equipment (UE) Internet Protocol (IP) address allocation, PDU session control, and so on.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 4:
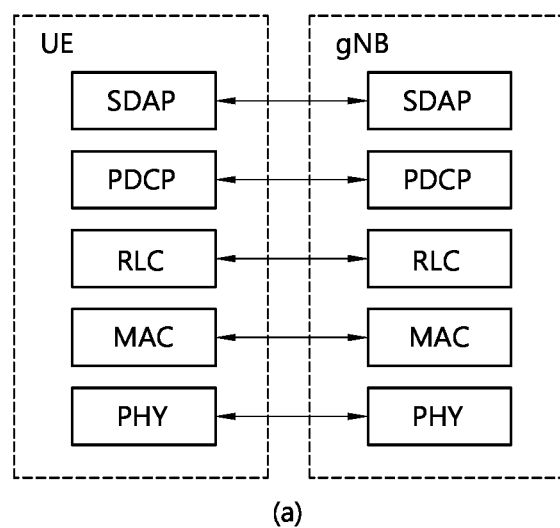
FIG. 4 shows a radio protocol architecture, based on an embodiment of the present disclosure.
Figure 4:
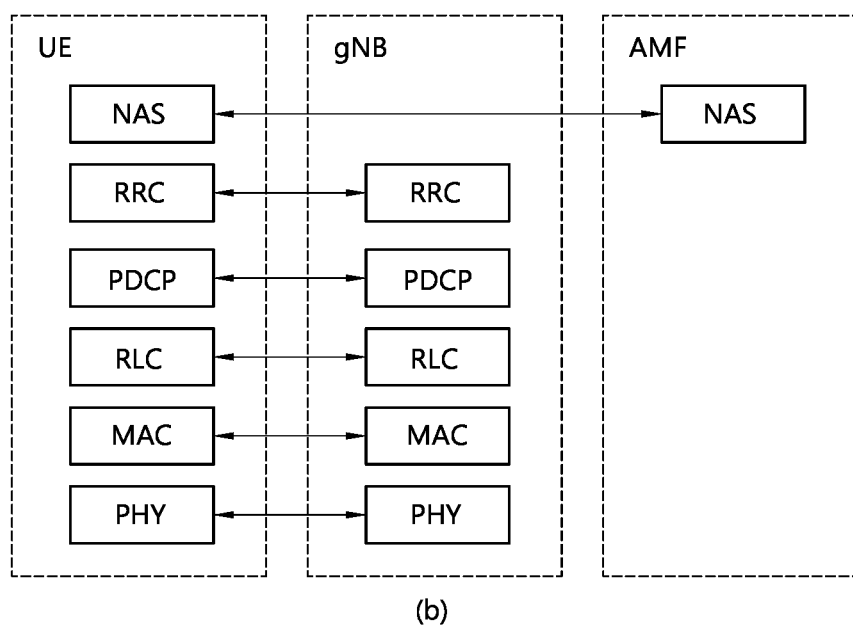

FIG. 4 shows a radio protocol architecture, based on an embodiment of the present disclosure. The embodiment of FIG. 4 may be combined with various embodiments of the present disclosure. Specifically, FIG. 4(a) shows a radio protocol architecture for a user plane, and FIG. 4(b) shows a radio protocol architecture for a control plane. The user plane corresponds to a protocol stack for user data transmission, and the control plane corresponds to a protocol stack for control signal transmission.

Referring to FIG. 4, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., the MAC layer, the RLC layer, and the packet data convergence protocol (PDCP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several OFDM symbols in a time domain and several sub-carriers in a frequency domain. One sub-frame includes a plurality of OFDM symbols in the time domain. A resource block is a unit of resource allocation, and consists of a plurality of OFDM symbols and a plurality of sub-carriers. Further, each subframe may use specific sub-carriers of specific OFDM symbols (e.g., a first OFDM symbol) of a corresponding subframe for a physical downlink control channel (PDCCH), i.e., an L1/L2 control channel. A transmission time interval (TTI) is a unit time of subframe transmission.

Figure 5:
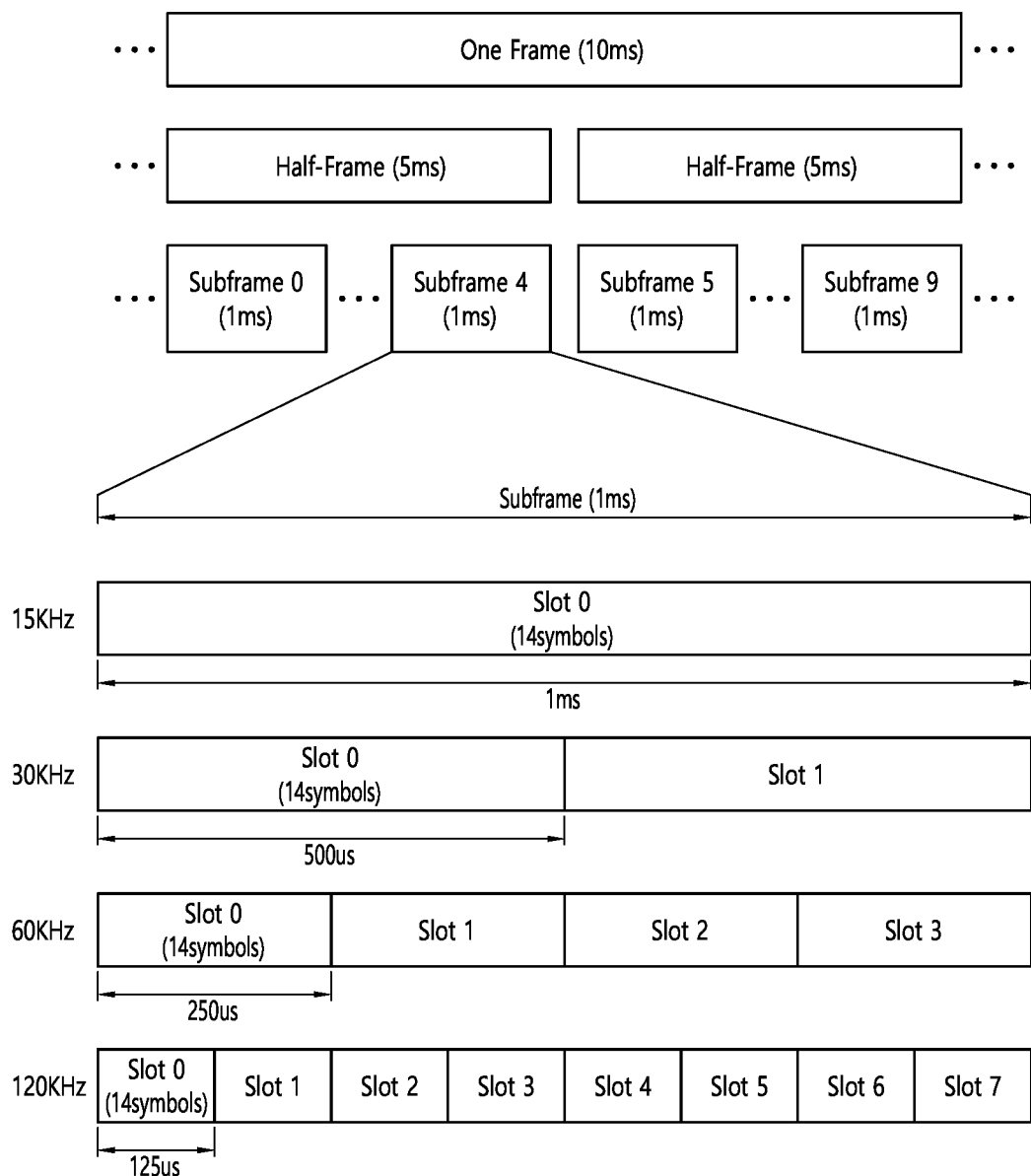
FIG. 5 shows a structure of an NR system, based on an embodiment of the present disclosure.

FIG. 5 shows a structure of an NR system, based on an embodiment of the present disclosure. The embodiment of FIG. 5 may be combined with various embodiments of the present disclosure.

Referring to FIG. 5, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined based on subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,\mu}_{slot}$), and a number of slots per subframe ($N^{subframe,\mu}_{slot}$) based on an SCS configuration (u), in a case where a normal CP is used.

TABLE 1

| SCS (15 * 2$^u$) | $N^{slot}_{symb}$ | $N^{frame,\mu}_{slot}$ | $N^{subframe,\mu}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe based on the SCS, in a case where an extended CP is used.

TABLE 2

| SCS (15 * 2$^u$) | $N^{slot}_{symb}$ | $N^{frame,\mu}_{slot}$ | $N^{subframe,\mu}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be 1-R1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
| --- | --- | --- |
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
| --- | --- | --- |
| FR1 | 410 MHz-7125 MHz | 15, 30, 60 kHz |
| FR2 | 24250 MHz-52600 MHz | 60, 120, 240 kHz |

Figure 6:
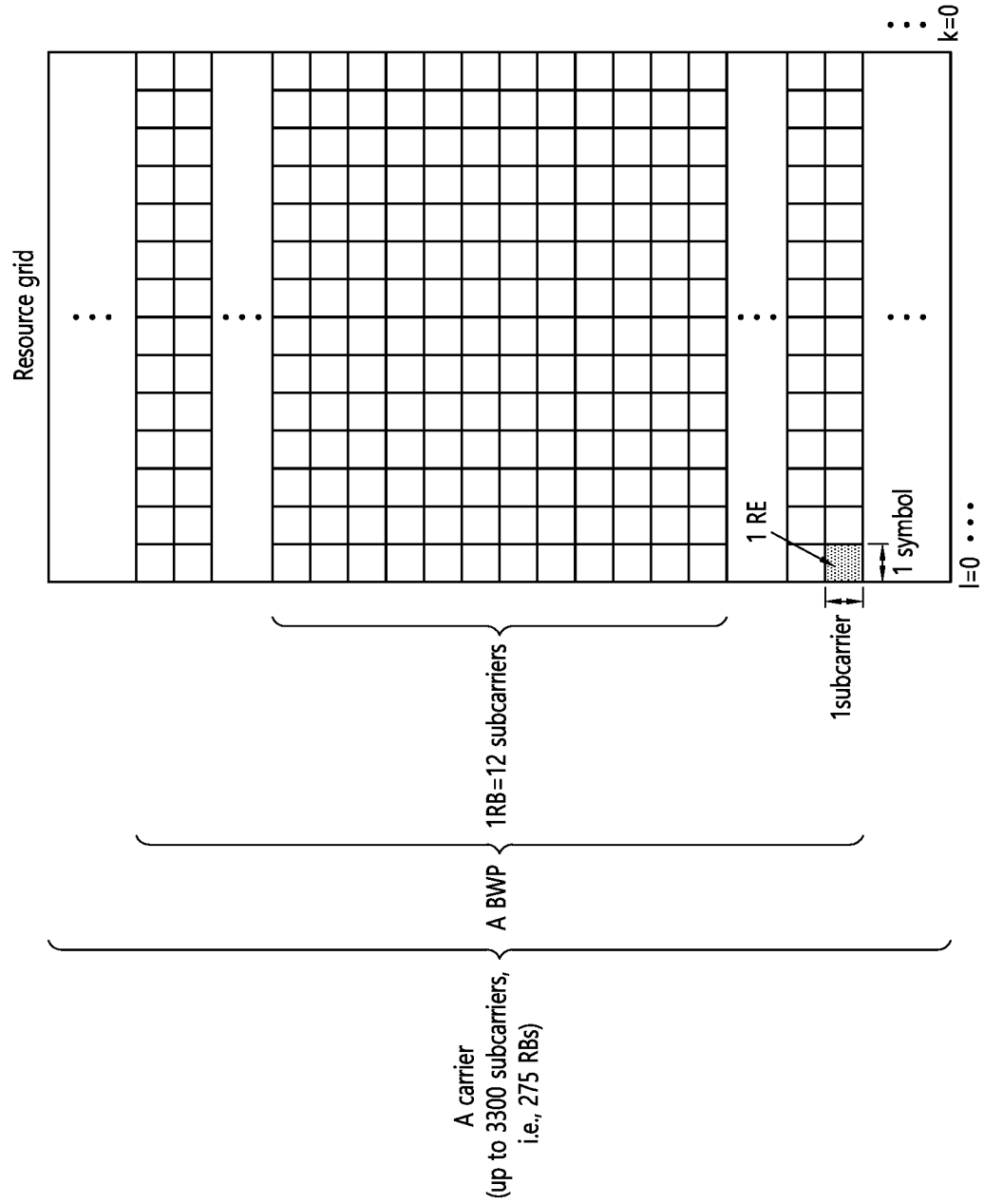
FIG. 6 shows a structure of a slot of an NR frame, based on an embodiment of the present disclosure.

FIG. 6 shows a structure of a slot of an NR frame, based on an embodiment of the present disclosure. The embodiment of FIG. 6 may be combined with various embodiments of the present disclosure.

Referring to FIG. 6, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P) RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Meanwhile, a radio interface between a UE and another UE or a radio interface between the UE and a network may consist of an L1 layer, an L2 layer, and an L3 layer. In various embodiments of the present disclosure, the L1 layer may imply a physical layer. In addition, for example, the L2 layer may imply at least one of a MAC layer, an RLC layer, a PDCP layer, and an SDAP layer. In addition, for example, the L3 layer may imply an RRC layer.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier.

When using bandwidth adaptation (BA), a reception bandwidth and transmission bandwidth of a UE are not necessarily as large as a bandwidth of a cell, and the reception bandwidth and transmission bandwidth of the BS may be adjusted. For example, a network/BS may inform the UE of bandwidth adjustment. For example, the UE receive information/configuration for bandwidth adjustment from the network/BS. In this case, the UE may perform bandwidth adjustment based on the received information/configuration. For example, the bandwidth adjustment may include an increase/decrease of the bandwidth, a position change of the bandwidth, or a change in subcarrier spacing of the bandwidth.

For example, the bandwidth may be decreased during a period in which activity is low to save power. For example, the position of the bandwidth may move in a frequency domain. For example, the position of the bandwidth may move in the frequency domain to increase scheduling flexibility. For example, the subcarrier spacing of the bandwidth may be changed. For example, the subcarrier spacing of the bandwidth may be changed to allow a different service. A subset of a total cell bandwidth of a cell may be called a bandwidth part (BWP). The BA may be performed when the BS/network configures the BWP to the UE and the BS/network informs the UE of the BWP currently in an active state among the configured BWPs.

For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, physical downlink shared channel (PDSCH), or channel state information-reference signal (CSI-RS) (excluding RRM) outside the active DL BWP. For example, the UE may not trigger a channel state information (CSI) report for the inactive DL BWP. For example, the UE may not transmit physical uplink control channel (PUCCH) or physical uplink shared channel (PUSCH) outside an active UL BWP. For example, in a downlink case, the initial BWP may be given as a consecutive RB set for a remaining minimum system information (RMSI) control resource set (CORE-SET) (configured by physical broadcast channel (PBCH)). For example, in an uplink case, the initial BWP may be given by system information block (SIB) for a random access procedure. For example, the default BWP may be configured by a higher layer. For example, an initial value of the default BWP may be an initial DL BWP. For energy saving, if the UE fails to detect downlink control information (DCI) during a specific period, the UE may switch the active BWP of the UE to the default BWP.

Meanwhile, the BWP may be defined for SL. The same SL BWP may be used in transmission and reception. For example, a transmitting UE may transmit n SL channel or a SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 7:
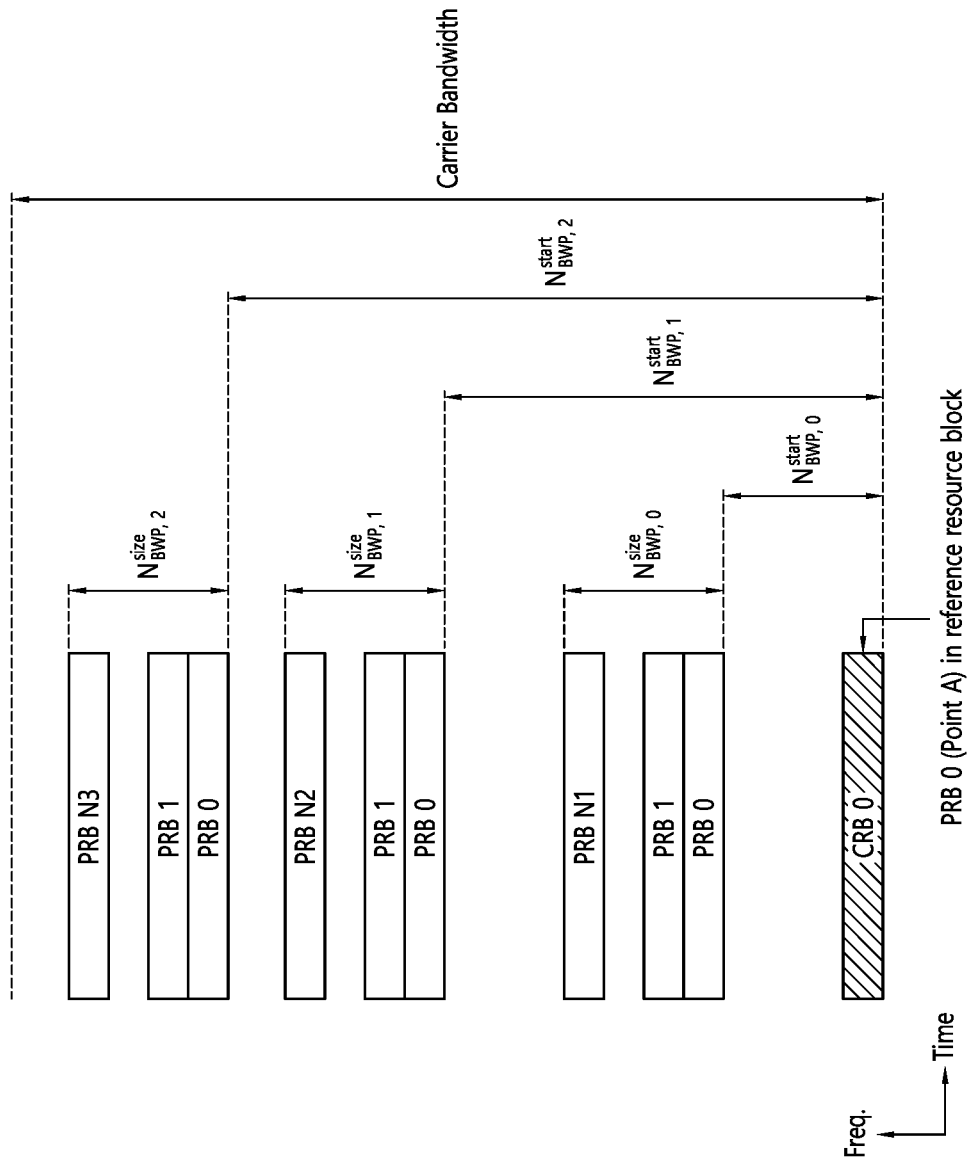
FIG. 7 shows an example of a BWP, based on an embodiment of the present disclosure.

FIG. 7 shows an example of a BWP, based on an embodiment of the present disclosure. The embodiment of FIG. 7 may be combined with various embodiments of the present disclosure. It is assumed in the embodiment of FIG. 7 that the number of BWPs is 3.

Referring to FIG. 7, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

Figure 8:
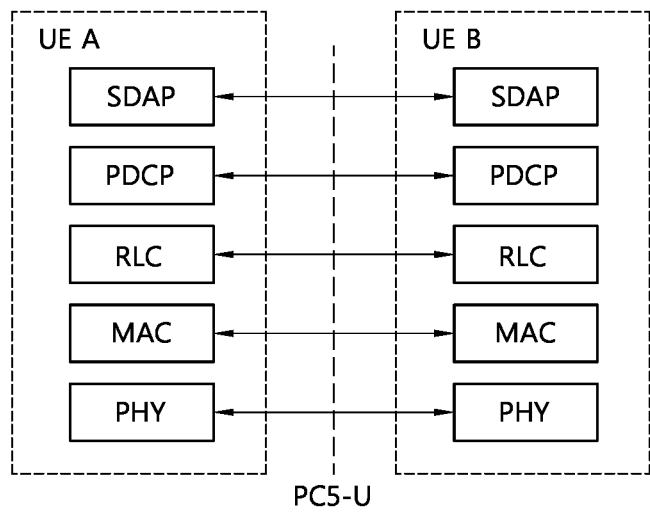
FIG. 8 shows a radio protocol architecture for a SL communication, based on an embodiment of the present disclosure.
Figure 8:
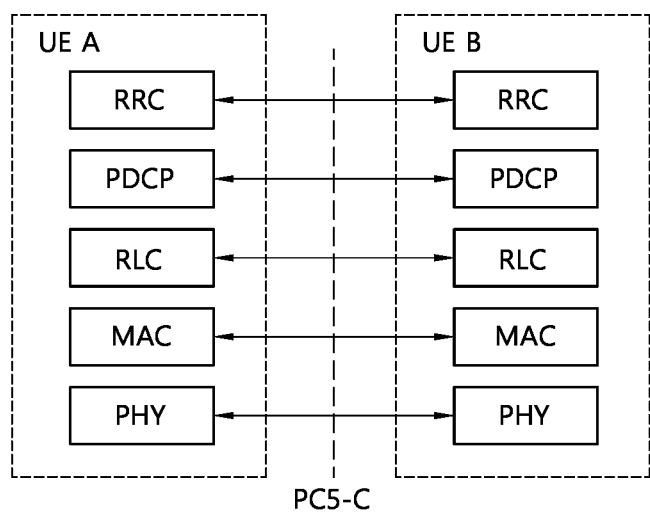

FIG. 8 shows a radio protocol architecture for a SL communication, based on an embodiment of the present disclosure. The embodiment of FIG. 8 may be combined with various embodiments of the present disclosure. More specifically, FIG. 8(a) shows a user plane protocol stack, and FIG. 8(b) shows a control plane protocol stack.

Hereinafter, a sidelink synchronization signal (SLSS) and synchronization information will be described.

The SLSS may include a primary sidelink synchronization signal (PSSS) and a secondary sidelink synchronization signal (SSSS), as a SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit cyclic redundancy check (CRC).

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 9:
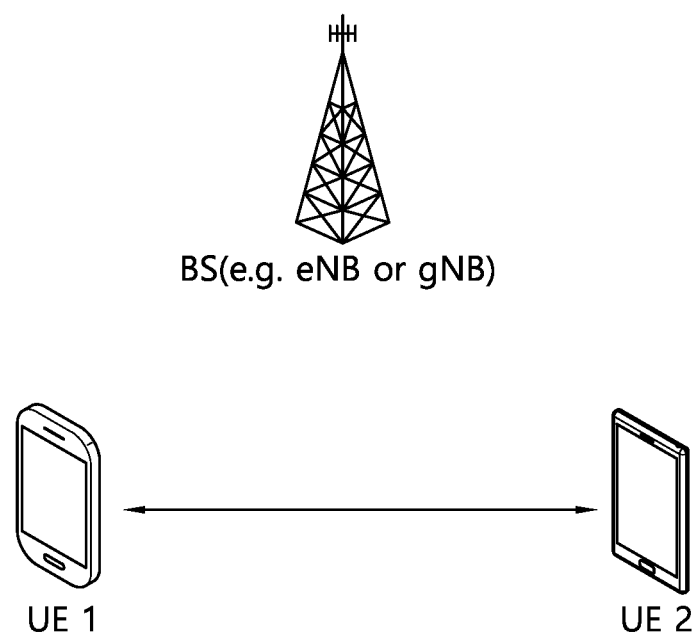
FIG. 9 shows a UE performing V2X or SL communication, based on an embodiment of the present disclosure.

FIG. 9 shows a UE performing V2X or SL communication, based on an embodiment of the present disclosure. The embodiment of FIG. 9 may be combined with various embodiments of the present disclosure.

Referring to FIG. 9, in V2X or SL communication, the term 'UE' may generally imply a UE of a user. However, if a network equipment such as a BS transmits/receives a signal according to a communication scheme between UEs, the BS may also be regarded as a sort of the UE. For example, a UE 1 may be a first apparatus 100, and a UE 2 may be a second apparatus 200.

For example, the UE 1 may select a resource unit corresponding to a specific resource in a resource pool which implies a set of series of resources. In addition, the UE 1 may transmit a SL signal by using the resource unit. For example, a resource pool in which the UE 1 is capable of transmitting a signal may be configured to the UE 2 which is a receiving UE, and the signal of the UE 1 may be detected in the resource pool.

Herein, if the UE 1 is within a connectivity range of the BS, the BS may inform the UE 1 of the resource pool. Otherwise, if the UE 1 is out of the connectivity range of the BS, another UE may inform the UE 1 of the resource pool, or the UE 1 may use a pre-configured resource pool.

In general, the resource pool may be configured in unit of a plurality of resources, and each UE may select a unit of one or a plurality of resources to use it in SL signal transmission thereof.

Hereinafter, resource allocation in SL will be described.

Figure 10:
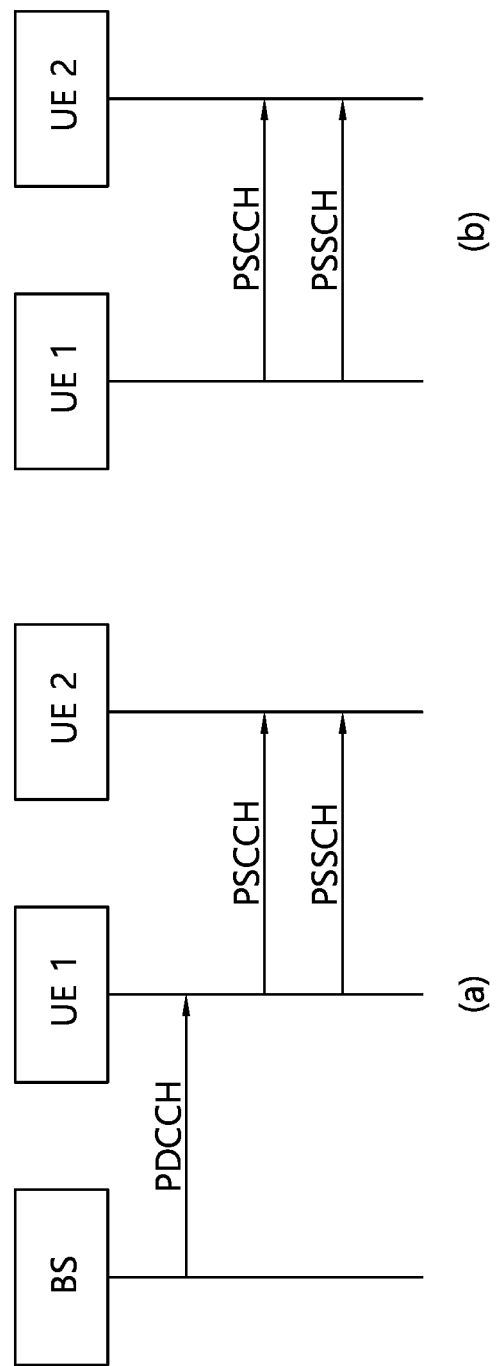
FIG. 10 shows a procedure of performing V2X or SL communication by a UE based on a transmission mode, based on an embodiment of the present disclosure.

FIG. 10 shows a procedure of performing V2X or SL communication by a UE based on a transmission mode, based on an embodiment of the present disclosure. The embodiment of FIG. 10 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, FIG. 10(a) shows a UE operation related to an LTE transmission mode 1 or an LTE transmission mode 3. Alternatively, for example, FIG. 10(a) shows a UE operation related to an NR resource allocation mode 1. For example, the LTE transmission mode 1 may be applied to general SL communication, and the LTE transmission mode 3 may be applied to V2X communication.

For example, FIG. 10(b) shows a UE operation related to an LTE transmission mode 2 or an LTE transmission mode 4. Alternatively, for example, FIG. 10(b) shows a UE operation related to an NR resource allocation mode 2.

Referring to FIG. 10(a), in the LTE transmission mode 1, the LTE transmission mode 3, or the NR resource allocation mode 1, a BS may schedule a SL resource to be used by the UE for SL transmission. For example, the BS may perform resource scheduling to a UE 1 through a PDCCH (more specifically, downlink control information (DCI)), and the UE 1 may perform V2X or SL communication with respect to a UE 2 according to the resource scheduling. For example, the UE 1 may transmit a sidelink control information (SCI) to the UE 2 through a physical sidelink control channel (PSCCH), and thereafter transmit data based on the SCI to the UE 2 through a physical sidelink shared channel (PSSCH).

Referring to FIG. 10(b), in the LTE transmission mode 2, the LTE transmission mode 4, or the NR resource allocation mode 2, the UE may determine a SL transmission resource within a SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannels. In addition, the UE 1 which has autonomously selected the resource within the resource pool may transmit the SCI to the UE 2 through a PSCCH, and thereafter may transmit data based on the SCI to the UE 2 through a PSSCH.

Figure 11:
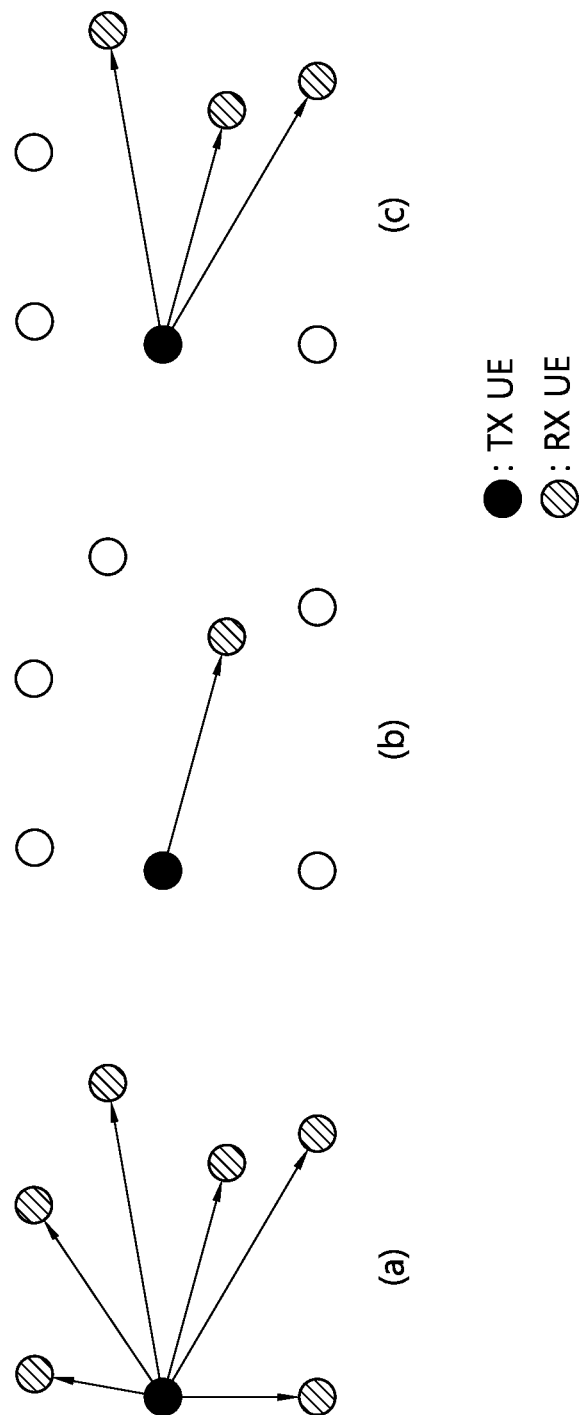
FIG. 11 shows three cast types, based on an embodiment of the present disclosure.

FIG. 11 shows three cast types, based on an embodiment of the present disclosure. The embodiment of FIG. 11 may be combined with various embodiments of the present disclosure. Specifically, FIG. 11(a) shows broadcast-type SL communication, FIG. 11(b) shows unicast type-SL communication, and FIG. 11(c) shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Hereinafter, an SR and/or BSR-based resource allocation procedure will be described.

For efficient use of radio resources, the base station needs to know the type of data and the amount of data to transmit through UL or SL for each UE. Accordingly, the UE may directly transmit information on UL data or SL data to be transmitted to the base station, and the base station may allocate UL resource(s) or SL resource(s) to the corresponding UE based on the information. In this case, the information on UL data or SL data transmitted by the UE to the base station may be the amount of UL data or SL data stored in a buffer of the UE. Herein, the amount of UL data or SL data stored in the buffer of the UE may be referred to as a buffer status report (BSR). For example, the BSR may be transmitted using a MAC control element if a resource on a PUSCH is allocated in the current TTI for the UE and a reporting event is triggered.

Figure 12:
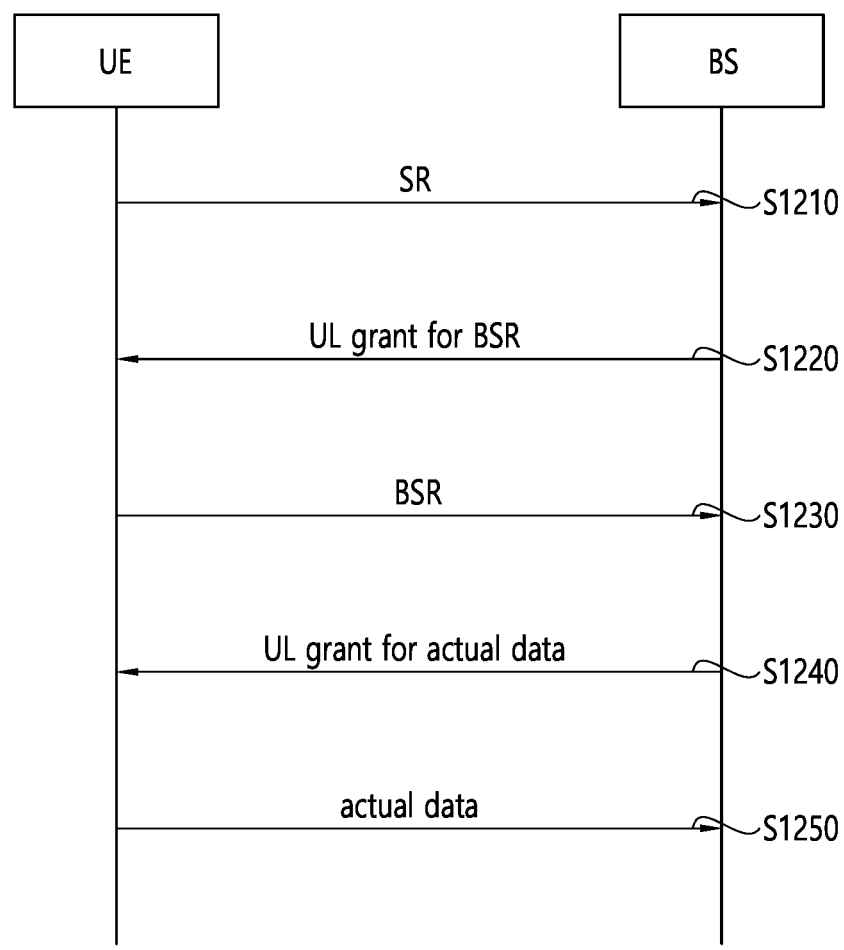
FIG. 12 shows a procedure in which a base station allocates a UL resource for actual data to a UE if a UL resource for buffer status reporting (BSR) is not allocated for the UE, based on an embodiment of the present disclosure.

FIG. 12 shows a procedure in which a base station allocates a UL resource for actual data to a UE if a UL resource for buffer status reporting (BSR) is not allocated for the UE, based on an embodiment of the present disclosure. The embodiment of FIG. 12 may be combined with various embodiments of the present disclosure.

Referring to FIG. 12, in step S1210, the UE may transmit a scheduling request (SR) to the base station in order to receive PUSCH resource allocation. For example, if a reporting event occurs but a resource for PUSCH transmission is not scheduled for the UE, the UE may transmit an SR for obtaining a resource for reporting a BSR to the base station in order to be allocated the PUSCH resource for UL transmission. For example, if a regular buffer status report (BSR) is triggered, but a UL resource for transmitting a BSR to the base station is not allocated to the UE, the UE may transmit an SR through a PUCCH. Specifically, the PUCCH resource through which the SR can be transmitted may be configured by a higher layer (e.g., RRC layer) specifically for the UE, and an SR configuration may include SR periodicity and/or SR subframe offset information.

In step S1220, the UE may receive a UL grant for a PUSCH resource for BSR transmission from the base station. In addition, in step S1230, the UE may transmit the triggered BSR to the base station by using the PUSCH resource allocated by the UL grant.

In step S1240, the base station may determine/check the amount of data to be actually transmitted through UL by the UE based on the BSR, and the base station may transmit a UL grant for a PUSCH resource for data to be actually transmitted to the UE.

In step S1250, the UE which has received the UL grant for actual data transmission may transmit actual UL data to the base station through the allocated PUSCH resource.

Figure 13:
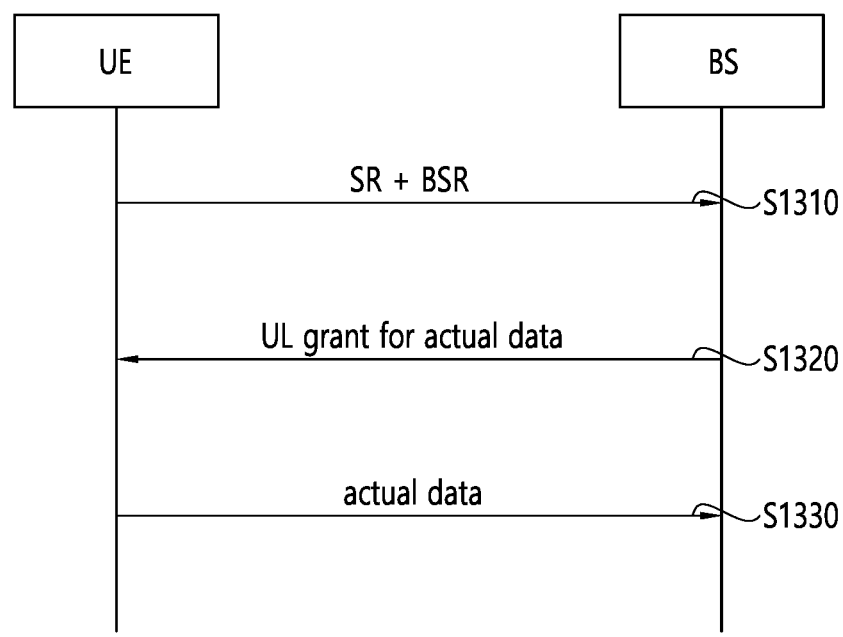
FIG. 13 shows a procedure in which a base station allocates a UL resource for actual data to a UE if a UL resource for buffer status reporting (BSR) is allocated for the UE, based on an embodiment of the present disclosure.

FIG. 13 shows a procedure in which a base station allocates a UL resource for actual data to a UE if a UL resource for buffer status reporting (BSR) is allocated for the UE, based on an embodiment of the present disclosure. The embodiment of FIG. 13 may be combined with various embodiments of the present disclosure.

Referring to FIG. 13, in step S1310, the UE may transmit a BSR to the base station by using an allocated PUSCH resource. Herein, the UE may transmit an SR together with the BSR to the base station.

In step S1320, the base station may determine/check the amount of data to be actually transmitted through UL by the UE based on the BSR, and the base station may transmit a UL grant for a PUSCH resource for data to be actually transmitted to the UE.

In step S1330, the UE which has received the UL grant for actual data transmission may transmit actual UL data to the base station through the allocated PUSCH resource.

Figure 14:
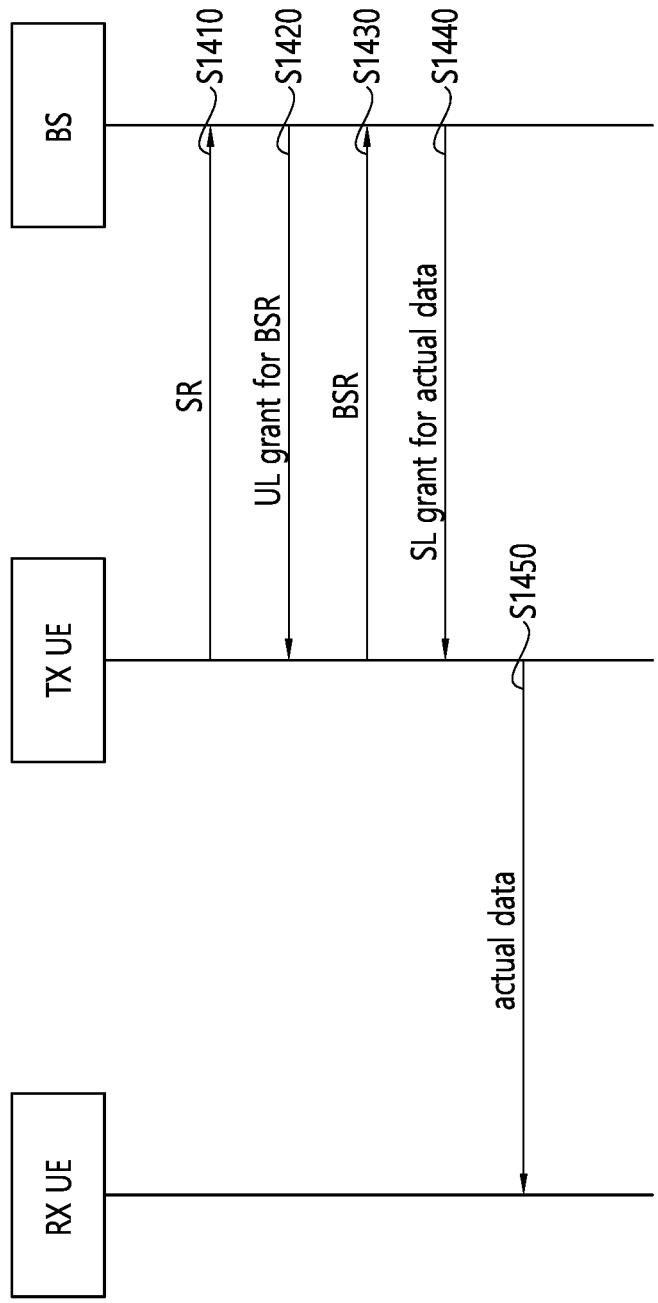
FIG. 14 shows a procedure in which a base station allocates a SL resource for actual data to a UE if a UL resource for buffer status reporting (BSR) is not allocated for the UE, based on an embodiment of the present disclosure.

FIG. 14 shows a procedure in which a base station allocates a SL resource for actual data to a UE if a UL resource for buffer status reporting (BSR) is not allocated for the UE, based on an embodiment of the present disclosure. The embodiment of FIG. 14 may be combined with various embodiments of the present disclosure.

Referring to FIG. 14, in step S1410, the UE may transmit a scheduling request (SR) to the base station in order to receive PUSCH resource allocation. For example, if a reporting event occurs but a resource for PUSCH transmission is not scheduled for the UE, the UE may transmit an SR to the base station in order to be allocated the PUSCH resource for UL transmission. For example, if a regular buffer status report (BSR) is triggered, but a UL resource for transmitting a BSR to the base station is not allocated to the UE, the UE may transmit an SR through a PUCCH. Specifically, the PUCCH resource through which the SR can be transmitted may be configured by a higher layer (e.g., RRC layer) specifically for the UE, and an SR configuration may include SR periodicity and/or SR subframe offset information.

In step S1420, the UE may receive a UL grant for a PUSCH resource for BSR transmission from the base station. In addition, in step S1430, the UE may transmit the triggered BSR to the base station by using the PUSCH resource allocated by the UL grant.

In step S1440, the base station may determine/check the amount of data to be actually transmitted through SL by the UE based on the BSR, and the base station may transmit a SL grant for a PSCCH/PSSCH resource for data to be actually transmitted to the UE.

In step S1450, the UE which has received the SL grant for actual data transmission may transmit actual SL data to another UE through the allocated PSCCH/PSSCH resource.

Figure 15:
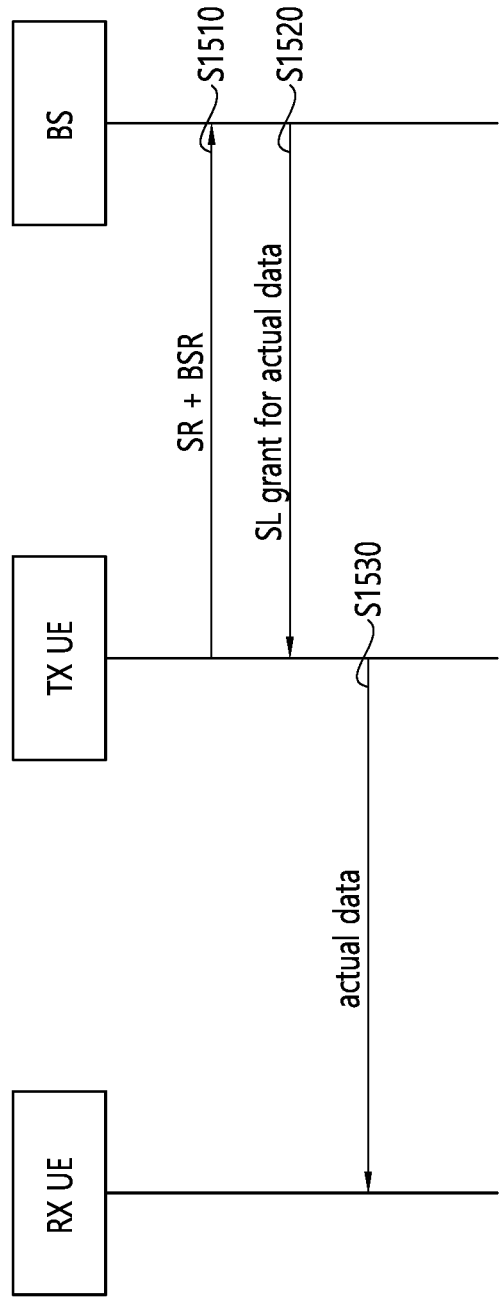
FIG. 15 shows a procedure in which a base station allocates a SL resource for actual data to a UE if a UL resource for buffer status reporting (BSR) is allocated for the UE, based on an embodiment of the present disclosure.

FIG. 15 shows a procedure in which a base station allocates a SL resource for actual data to a UE if a UL resource for buffer status reporting (BSR) is allocated for the UE, based on an embodiment of the present disclosure. The embodiment of FIG. 15 may be combined with various embodiments of the present disclosure.

Referring to FIG. 15, in step S1510, the UE may transmit a BSR to the base station by using an allocated PUSCH resource. Herein, the UE may transmit an SR together with the BSR to the base station.

In step S1520, the base station may determine/check the amount of data to be actually transmitted through SL by the UE based on the BSR, and the base station may transmit a SL grant for a PSCCH/PSSCH resource for data to be actually transmitted to the UE.

In step S1530, the UE which has received the SL grant for actual data transmission may transmit actual SL data to another UE through the allocated PSCCH/PSSCH resource.

Meanwhile, in the future sidelink, V2X communication through a relay may be supported. In the past, technologies for supporting NR-based V2X-related road safety services have been developed. On the other hand, in order to support various applications and services and extent a coverage and/or increase power efficiency of sidelink and/or a network (NW) in in-coverage or out-coverage, sidelink communication through a relay needs to be supported.

Meanwhile, scenarios for sidelink relay include a scenario related to UE-to-UE relay and a scenario related to UE-to-NW relay. For example, according to the UE-to-UE relay, in order for communication between a first UE and a second UE, a third UE (i.e., a relay UE) may relay data traffic between the first UE and the second UE. For example, according to the UE-to-NW relay, in order for communication between a first UE and a base station, a second UE (i.e., a relay UE) may relay data traffic between the first UE and the base station. For example, according to the UE-to-NW relay, in order for communication between a first UE and a second UE, a third UE (i.e., a relay UE) and a base station may relay data traffic between the first UE and the second UE.

In the present disclosure, a remote UE may be a UE that initially generates data (e.g., PSSCH) and/or control information (e.g., PSCCH) and transmits it to a relay UE, and the relay UE may be a UE that relays data, and a target UE may be a target UE with which the remote UE intends to communicate.

In the above-described relay scenarios, there may be multiple remote UEs related to a relay UE. For example, the remote UE may be a target UE to be managed by the relay UE. For example, the remote UE may be a target UE to which the relay UE should relay data. In this case, the relay UE may have to relay all data received from the multiple remote UEs to the target UE or the network. For this, the relay UE may need to be configured with an appropriate resource grant.

For example, the UE in the UE-to-NW relay scenario or the mode 1 UE in the UE-to-UE relay scenario should transmit a scheduling request (SR) and/or a buffer status report (BSR) in order to receive an appropriate resource grant from the base station. In this case, the relay UE needs to request resource allocation from the base station in a different way from the SR/BSR for receiving a SL grant or a UL grant for transmitting its upper data in the legacy SL or UL. For example, if there are multiple remote UEs managed by the relay UE, there may be a problem whether the relay UE requests resource allocation from the base station by considering all data received from all remote UEs as a buffer status to be managed by the relay UE or the relay UE requests resource allocation from the base station independently by considering data received from each remote UE as a separate buffer state. Based on various embodiments of the present disclosure, a method for the relay UE to manage a buffer status and an apparatus supporting the same are proposed.

Based on an embodiment of the present disclosure, the relay UE may request resource allocation from the base station in order to receive a grant for relaying packet(s) from the base station. For example, the relay UE may transmit information for requesting resource allocation to the base station in order to receive a resource for relaying packet(s) from the base station. According to the conventional resource request method, if upper data accumulated in logical channel(s) (LCH(s)) pre-configured for the UE is available, the UE may determine the available data of all LCH(s) as a buffer status, and the UE may transmit an SR to the base station. In addition, the UE may transmit a BSR to the base station based on a grant received from the base station in response to the SR. In addition, the UE may transmit data based on a grant received from the base station in response to the BSR. Meanwhile, an SR/BSR procedure different from the conventional SR/BSR procedure may be required for the SL relay. For example, the relay UE may have a buffer for managing packet(s)/data received from one or more remote UEs. In the present disclosure, the packet(s)/data relayed by the relay UE may be referred to as relay packet(s) or relay data. In the present disclosure, the buffer for managing relay packet(s)/data may be referred to as a relay buffer. For example, the relay buffer may be a buffer for the relay UE to relay data of the remote UE, and it may not be a buffer for the relay UE to transmit data of its upper layer. For example, the relay UE may report relay buffer status to the base station, and the base station may transmit a grant to the relay UE based on the relay buffer status. In addition, for example, the relay UE may transmit relay data by using a resource allocated by the grant. Herein, the relay buffer status may be the sum of data being buffered by the relay UE which decodes data received from one or more remote UEs and then transfers it to the MAC layer, unlike the sum of data of available LCH(s) of an upper layer of the existing UE.

For example, in the prior art, in order for the UE to receive from the base station a grant for transmitting its higher layer data through a Uu interface, the UE may transmit an SR/BSR to the base station. Unlike the prior art, if data is available in a relay buffer in which data received from one or more remote UEs is accommodated, the relay UE may trigger SR transmission. Thereafter, based on the SR, the base station may transmit a grant for the relay UE to report a BSR for transmission of relay data to the relay UE. In addition, based on the grant, the relay UE may trigger the BSR for reporting the volume of data available in the relay buffer to the base station. As described above, in order for the relay UE to configure an additional buffer for relay data only, the relay UE may receive a radio bearer configuration related to relay (in advance) from the base station. Herein, the radio bearer configuration may include a mapping relationship between a radio bearer configuration related to relay and a bearer configuration related to data received from one or more remote UEs. The reason why the mapping relationship is necessary may be to determine a configuration to be used for transmission among radio bearer configurations related to relay when the relay UE binds data received from one or more remote UEs according to characteristics (e.g., QoS characteristics or LCH characteristics) and transmits it to the base station.

Figure 16:
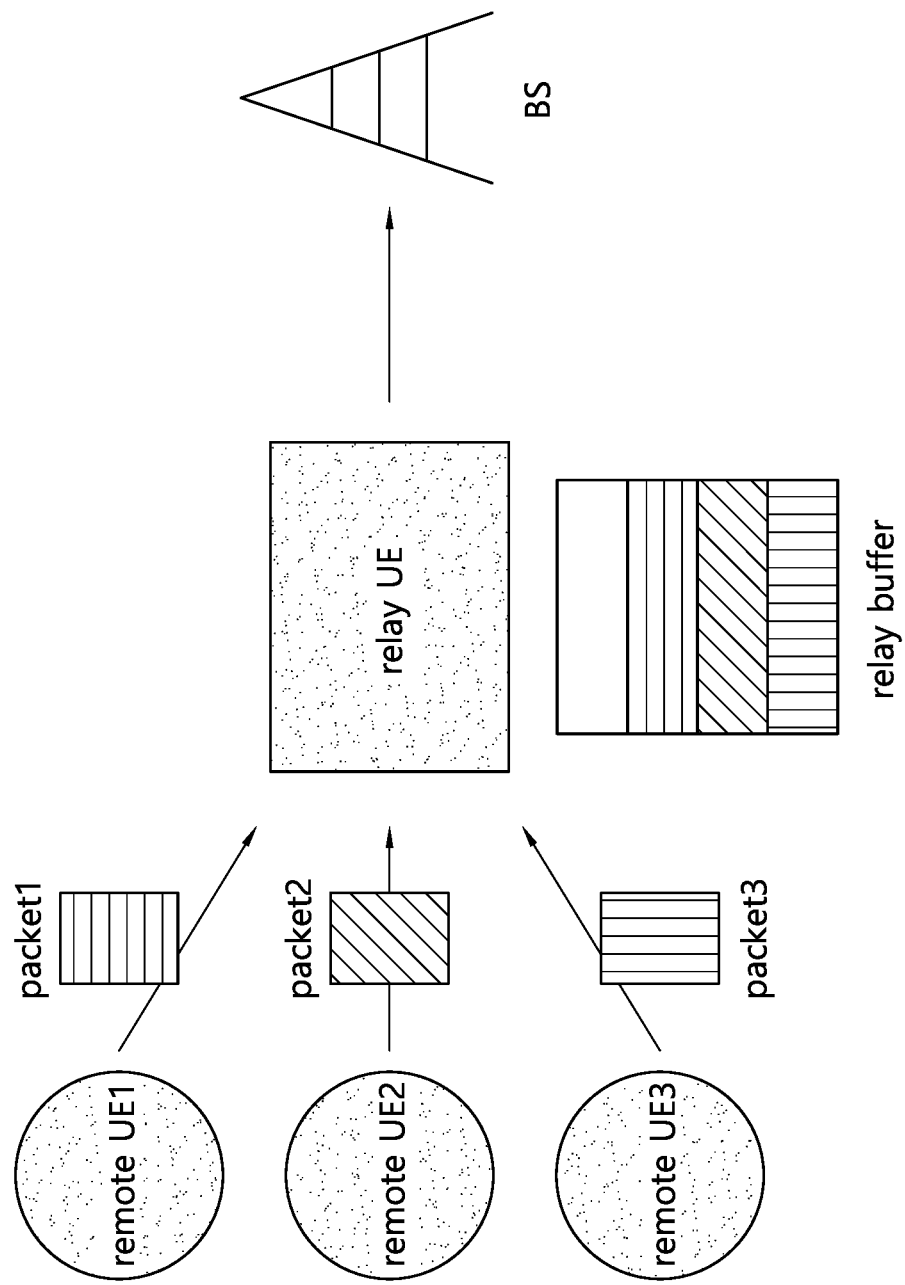
FIG. 16 shows a method for a relay UE to manage relay data received from remote UEs in a relay buffer, based on an embodiment of the present disclosure.

FIG. 16 shows a method for a relay UE to manage relay data received from remote UEs in a relay buffer, based on an embodiment of the present disclosure. The embodiment of FIG. 16 may be combined with various embodiments of the present disclosure.

Referring to FIG. 16, the relay UE may manage the remote UE 1, the remote UE 2, and the remote UE 3. For example, the relay UE may receive independent sidelink data from each remote UE, and the relay UE may fill a relay buffer with data received from each remote UE. According to the embodiment of FIG. 16, the relay UE may manage data of all remote UEs at once. Accordingly, the relay UE may trigger an SR based on relay buffer status for transmission of all relay data. In addition, the relay UE may report the relay buffer status to the base station at once based on a UL grant received from the base station in response to the SR.

For example, after the relay UE reports the relay buffer status to the base station, the relay UE may relay data received from each remote UE to the base station or the target UE based on the grant received from the base station in response to the relay buffer status. In this case, the relay UE may (internally) know a grant to which data received from a specific remote UE should be mapped, and the relay UE may transmit information on the specific remote UE together with the data. For example, if the relay UE transmits a MAC PDU based on the grant received from the base station, the relay UE may transmit by additionally including each source ID received from each remote UE in each MAC PDU.

Figure 17:
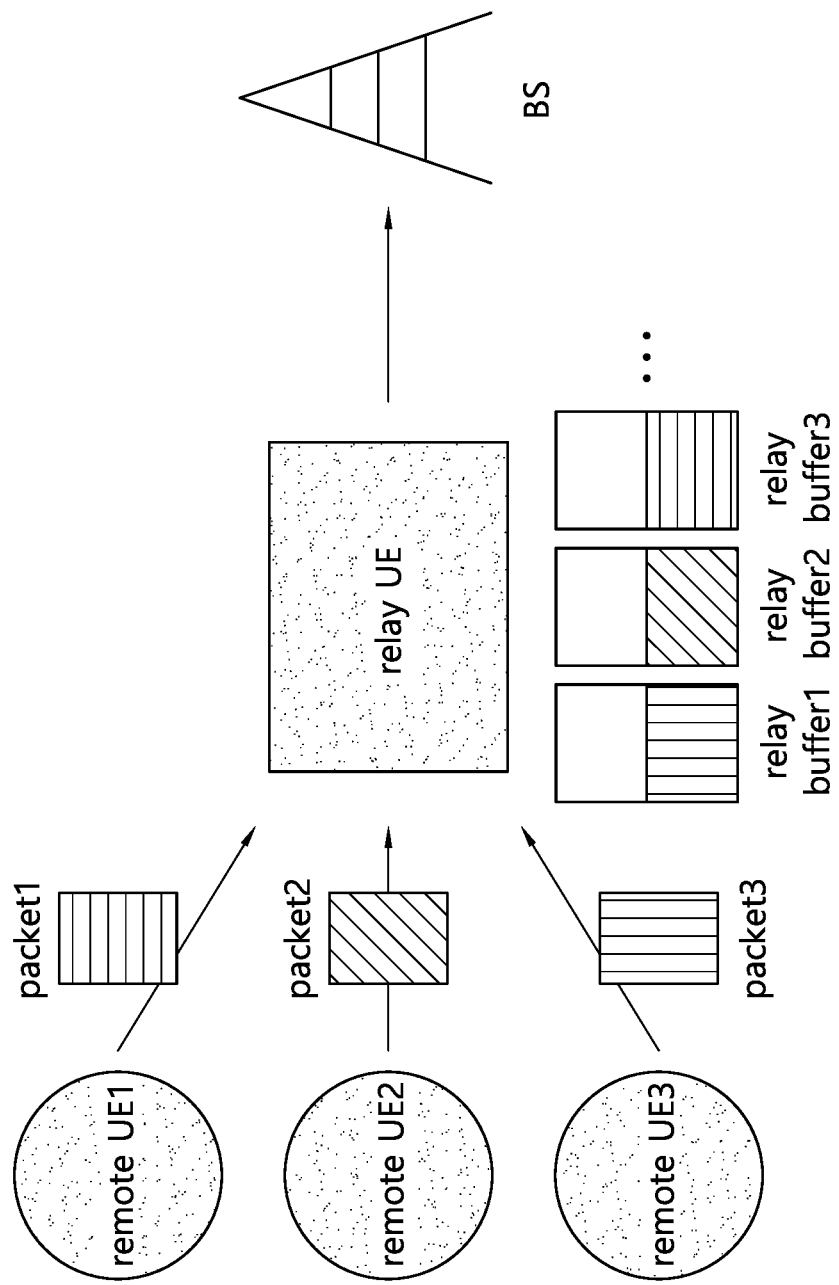
FIG. 17 shows a method for a relay UE to manage relay data received from remote UEs in a relay buffer, based on an embodiment of the present disclosure.

FIG. 17 shows a method for a relay UE to manage relay data received from remote UEs in a relay buffer, based on an embodiment of the present disclosure. The embodiment of FIG. 17 may be combined with various embodiments of the present disclosure.

Referring to FIG. 17, the relay UE may manage relay data received from each remote UE in different relay buffers. For such independent relay buffer management, for example, each remote UE may receive a sidelink radio bearer (SLRB) configuration for sidelink communication from the base station. Then, the remote UE may transmit its SLRB configuration to the relay UE, and the relay UE may duplicate and configure each LCH configuration for each remote UE based on each SLRB configuration received from each remote UE. For example, the SLRB configuration may be transmitted through a PC5-RRC message. Under the above configuration, the relay UE may store data received from each remote UE in each duplicated and configured LCH buffer. Then, if there is data available in each relay buffer of the relay UE, the relay UE may trigger an SR and/or a BSR for relaying data. In this case, if there are a plurality of remote UEs managed by the relay UE, the relay UE may have to continuously transmit a plurality of SRs. In this case, in the case of relay data related to an SR transmitted relatively late, a large delay may occur until a grant for actual transmission is received. Therefore, the relay UE may determine which SR for transmission of relay data to be transmitted preferentially according to QoS information (e.g., priority or latency requirement) of data received from each remote UE. For example, the QoS information may be priority information included in SCI transmitted by the remote UE. For example, the QoS information may be derived from a QoS flow ID carried on a PC5-RRC message.

For example, if there are a plurality of remote UEs managed by the relay UE, the relay UE may preferentially transmit an SR for relay data related to the highest priority and/or the lowest latency budget, among relay data received from a plurality of remote UEs, to the base station.

For example, the relay UE may simply have a plurality of relay buffers without duplicating each SLRB configuration of each remote UE. For example, referring to FIG. 17, the relay UE may manage the remote UE 1, the remote UE 2, and the remote UE 3. For example, the relay UE may fill a MAC PDU by reconstructing data received from each remote UE and stored in a plurality of relay buffers. Then, unlike the existing SR/BSR trigger condition, if available data is generated in the relay buffer, the relay UE may trigger an SR for BSR reporting. This is different from conventional in which the UE considers the combined data transferred from the upper layer in LCH(s) as buffer status. Similarly, as mentioned above, the relay UE may determine an SR related to a relay buffer to be transmitted preferentially according to a priority or latency requirements of data received from each remote UE. That is, the relay UE may preferentially transmit an SR for a relay buffer having the highest priority and/or the lowest latency budget, among relay buffers.

In the above operation, a grant used by the relay UE to transmit each relay data to the base station or the target UE may be independently scheduled. In addition, the relay UE may relay, based on the scheduled grant, including information on each remote UE (e.g., L1/L2 source ID of the remote UE).

For example, the relay UE may receive a grant (e.g., SL grant or UL grant) for relay data (in advance) from the base station. For example, the relay UE may transmit an SR and/or a BSR for transmission of data having a volume predicted in advance from one or more remote UEs managed by the relay UE to the base station. For example, when the remote UE selects the relay UE, a connection between two UEs (e.g., PC5-RRC or PC5-S) may be established, and the remote UE may report information related to the volume of predicted data transmission through the established connection to the relay UE. Then, the relay UE may trigger the SR and/or the BSR by calculating or estimating the volume of total data received from all remote UEs managed by the relay UE.

For example, the relay UE may transmit an SR/BSR in order to receive a grant for transmitting UL data of its upper layer. Herein, the relay UE may transmit relay data based on the received UL grant or SL grant. For example, the relay UE may transmit not only data to be transmitted by the relay UE but also data received from the remote UE based on the UL grant or the SL grant received from the base station. For example, the UE may receive a grant (e.g., UL grant or SL grant) for its data transmission from the base station. In this case, if there is data to be relayed to the NW, the relay UE may transmit the relay data to the NW based on the UL grant. On the other hand, if there is data to be relayed to the target UE, the relay UE may transmit the relay data to the target UE based on the SL grant. In this case, which transmission the UE prioritizes (i.e., whether the UE transmits its upper layer data first or relay data first) may be (pre-)configured for the UE from the base station. Or, for example, the UE may compare priorities of each data, and the UE may transmit data having a higher priority first. For example, the priority may be an L1 priority indicated by SCI. For example, the UE may compare priorities of LCHs related to each data, and the UE may transmit data having a higher priority first.

Figure 18:
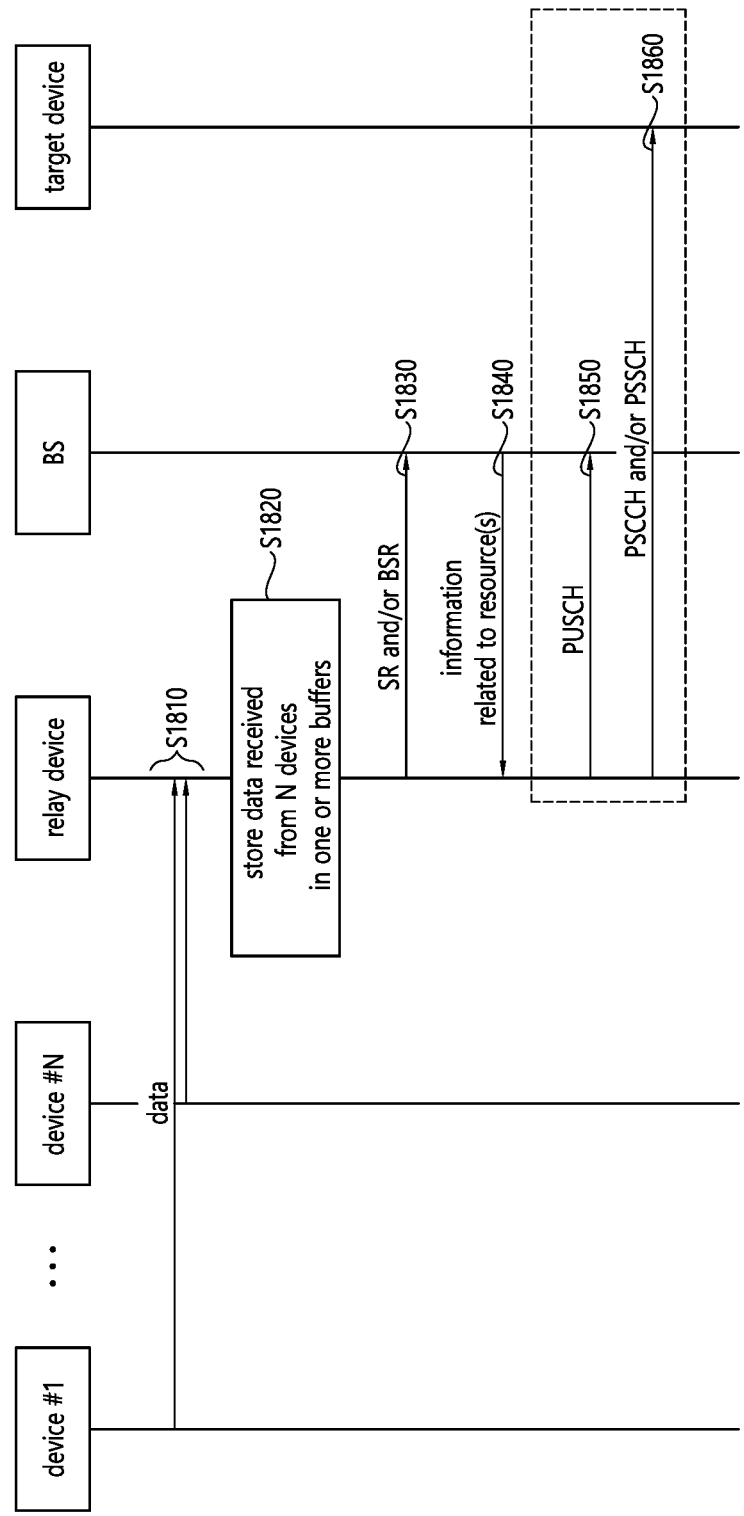
FIG. 18 shows a procedure in which a relay device relays data based on one or more relay buffers, based on an embodiment of the present disclosure.

FIG. 18 shows a procedure in which a relay device relays data based on one or more relay buffers, based on an embodiment of the present disclosure. The embodiment of FIG. 18 may be combined with various embodiments of the present disclosure.

Referring to FIG. 18, in step S1810, the relay device may receive data from devices #1 to #N. For example, N may be a positive integer.

In step S1820, the relay device may store data received from the N devices in one or more buffers. For example, the buffer may be a buffer for relay. For example, the buffer for relay may be configured independently of a buffer for the device to transmit its own data. For example, the buffer for relay may be configured to be the same as a buffer for the device to transmit its own data. For example, there may be one buffer for relay, and in this case, the relay device may store data received from the N devices in the same buffer. For example, there may be N buffers for relay, and in this case, the relay device may store data received from the N devices in the N buffers, respectively.

In step S1830, the relay device may transmit an SR and/or a BSR related to the one or more buffers to the base station, based on available data being in the one or more buffers.

In step S1840, in response to the SR and/or the BSR, the relay device may receive information related to resource(s) from the base station. For example, if the relay device intends to relay data to the target device (e.g., UE), the resource(s) may be SL resource(s) (e.g., PSCCH resource and/or PSSCH resource). For example, if the relay device intends to relay data to the base station, the resource(s) may be UL resource(s) (e.g., a PUSCH resource).

For example, if the relay device receives information related to the UL resource(s), in step S1850, the relay device may relay/transmit data to the base station by using the UL resource(s). For example, the relay device may transmit a PUSCH to the base station.

For example, if the relay device receives information related to the SL resource(s), in step S1860, the relay device may relay/transmit data to the target device by using the SL resource(s). For example, the relay device may transmit a PSCCH and/or a PSSCH to the base station.

Figure 19:
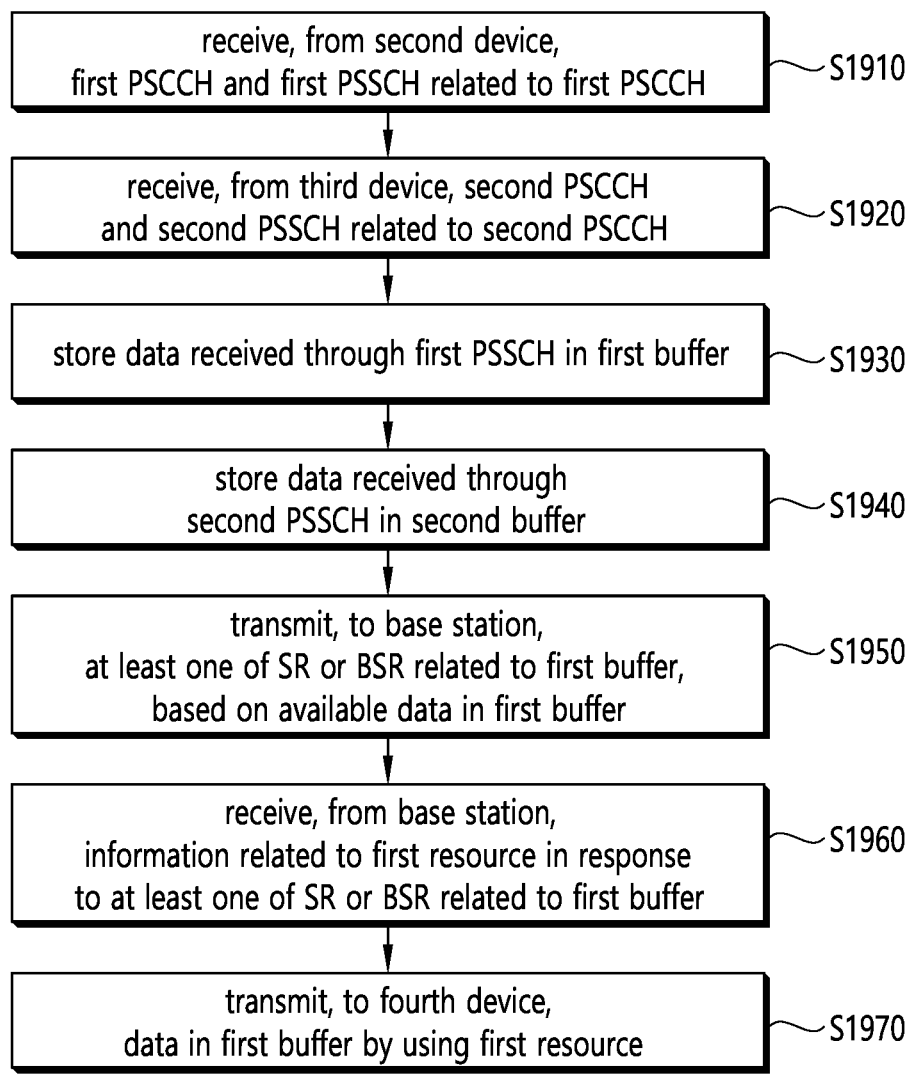
FIG. 19 shows a method for a first device to perform wireless communication, based on an embodiment of the present disclosure.

FIG. 19 shows a method for a first device to perform wireless communication, based on an embodiment of the present disclosure. The embodiment of FIG. 19 may be combined with various embodiments of the present disclosure.

Referring to FIG. 19, in step S1910, the first device may receive, from a second device, a first physical sidelink control channel (PSCCH) and a first physical sidelink shared channel (PSSCH) related to the first PSCCH. In step S1920, the first device may receive, from a third device, a second PSCCH and a second PSSCH related to the second PSCCH. In step S1930, the first device may store data received through the first PSSCH in a first buffer. In step S1940, the first device may store data received through the second PSSCH in a second buffer. In step S1950, the first device may transmit, to a base station, at least one of a scheduling request (SR) or a buffer status report (BSR) related to the first buffer, based on available data in the first buffer. In step S1960, the first device may receive, from the base station, information related to a first resource in response to at least one of the SR or the BSR related to the first buffer. In step S1970, the first device may transmit, to a fourth device, data in the first buffer by using the first resource.

For example, an SR and a BSR related to the second buffer may not be transmitted based on no available data in the second buffer.

Additionally, for example, the first device may transmit, to the base station, at least one of an SR or a BSR related to the second buffer, based on available data in the second buffer. For example, the SR or the BSR related to the first buffer may be transmitted preferentially over the SR or the BSR related to the second buffer. For example, a priority value included in sidelink control information (SCI) received through the first PSCCH may be less than a priority value included in SCI received through the second PSCCH. For example, a latency budget related to the data received through the first PSCCH may be less than a latency budget related to the data received through the second PSCCH. Additionally, for example, the first device may receive, from the base station, information related to a second resource in response to at least one of the SR or the BSR related to the second buffer.

For example, the data in the first buffer may be transmitted to the fourth device through a third PSCCH and a third PSSCH related to the third PSCCH on the first resource. For example, SCI and a medium access control (MAC) packet data unit (PDU) received from the second device through the first PSSCH may include a source ID of the second device, and a MAC PDU transmitted to the fourth device through the third PSSCH may include the source ID of the second device.

For example, the data in the first buffer may be transmitted to the fourth device through a physical uplink shared channel (PUSCH) on the first resource. For example, the fourth device may be the base station. For example, SCI and a MAC PDU received from the second device through the first PSSCH may include a source ID of the second device, and a MAC PDU transmitted to the fourth device through the PUSCH may include the source ID of the second device.

Additionally, for example, the first device may receive, from the second device, a sidelink radio bearer (SLRB) configuration related to the second device, and the first device may receive, from the third device, an SLRB configuration related to the third device.

Additionally, for example, the first device may store data from an upper layer of the first device in a third buffer, and the first device may transmit, to the base station, at least one of an SR or a BSR related to the third buffer, based on available data in the third buffer.

The proposed method can be applied to the device(s) described below. First, the processor 102 of the first device 100 may control the transceiver 106 to receive, from a second device, a first physical sidelink control channel (PSCCH) and a first physical sidelink shared channel (PSSCH) related to the first PSCCH. In addition, the processor 102 of the first device 100 may control the transceiver 106 to receive, from a third device, a second PSCCH and a second PSSCH related to the second PSCCH. In addition, the processor 102 of the first device 100 may store data received through the first PSSCH in a first buffer. In addition, the processor 102 of the first device 100 may store data received through the second PSSCH in a second buffer. In addition, the processor 102 of the first device 100 may control the transceiver 106 to transmit, to a base station, at least one of a scheduling request (SR) or a buffer status report (BSR) related to the first buffer, based on available data in the first buffer. In addition, the processor 102 of the first device 100 may control the transceiver 106 to receive, from the base station, information related to a first resource in response to at least one of the SR or the BSR related to the first buffer. In addition, the processor 102 of the first device 100 may control the transceiver 106 to transmit, to a fourth device, data in the first buffer by using the first resource.

Based on an embodiment of the present disclosure, a first device adapted to perform wireless communication may be provided. For example, the first device may comprise: one or more memories storing instructions; one or more transceivers; and one or more processors connected to the one or more memories and the one or more transceivers. For example, the one or more processors may execute the instructions to: receive, from a second device, a first physical sidelink control channel (PSCCH) and a first physical sidelink shared channel (PSSCH) related to the first PSCCH; receive, from a third device, a second PSCCH and a second PSSCH related to the second PSCCH; store data received through the first PSSCH in a first buffer; store data received through the second PSSCH in a second buffer; transmit, to a base station, at least one of a scheduling request (SR) or a buffer status report (BSR) related to the first buffer, based on available data in the first buffer; receive, from the base station, information related to a first resource in response to at least one of the SR or the BSR related to the first buffer; and transmit, to a fourth device, data in the first buffer by using the first resource.

Based on an embodiment of the present disclosure, an apparatus adapted to control a first user equipment (UE) performing wireless communication may be provided. For example, the apparatus may comprise: one or more processors; and one or more memories operably connected to the one or more processors and storing instructions. For example, the one or more processors may execute the instructions to: receive, from a second UE, a first physical sidelink control channel (PSCCH) and a first physical sidelink shared channel (PSSCH) related to the first PSCCH; receive, from a third UE, a second PSCCH and a second PSSCH related to the second PSCCH; store data received through the first PSSCH in a first buffer; store data received through the second PSSCH in a second buffer; transmit, to a base station, at least one of a scheduling request (SR) or a buffer status report (BSR) related to the first buffer, based on available data in the first buffer; receive, from the base station, information related to a first resource in response to at least one of the SR or the BSR related to the first buffer; and transmit, to a fourth UE, data in the first buffer by using the first resource.

Based on an embodiment of the present disclosure, a non-transitory computer-readable storage medium storing instructions may be provided. For example, the instructions, when executed, may cause a first device to: receive, from a second device, a first physical sidelink control channel (PSCCH) and a first physical sidelink shared channel (PSSCH) related to the first PSCCH; receive, from a third device, a second PSCCH and a second PSSCH related to the second PSCCH; store data received through the first PSSCH in a first buffer; store data received through the second PSSCH in a second buffer; transmit, to a base station, at least one of a scheduling request (SR) or a buffer status report (BSR) related to the first buffer, based on available data in the first buffer; receive, from the base station, information related to a first resource in response to at least one of the SR or the BSR related to the first buffer; and transmit, to a fourth device, data in the first buffer by using the first resource.

Various embodiments of the present disclosure may be combined with each other.

Hereinafter, device(s) to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 20:
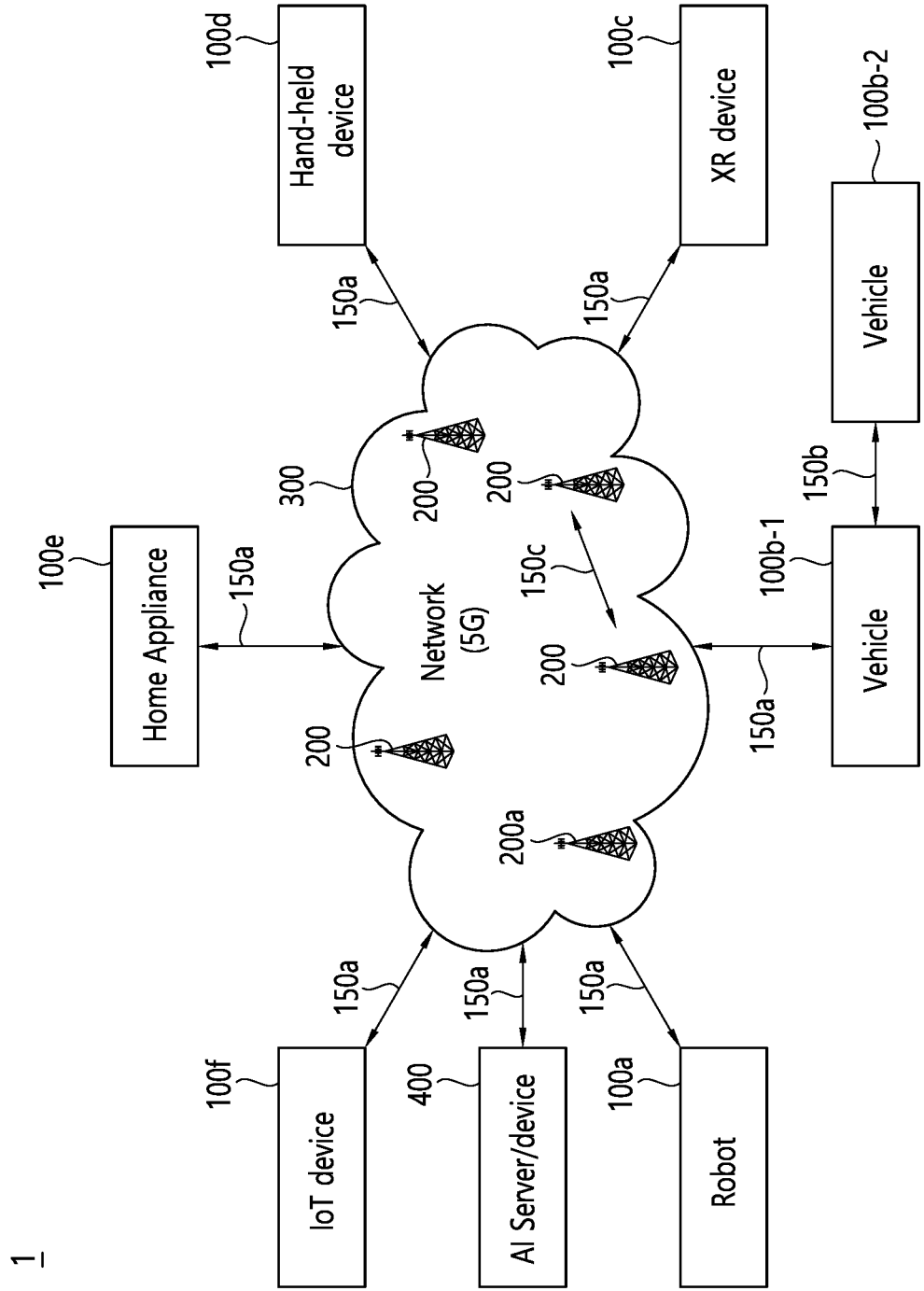
FIG. 20 shows a communication system 1, based on an embodiment of the present disclosure.

FIG. 20 shows a communication system 1, based on an embodiment of the present disclosure.

Referring to FIG. 20, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g., relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 21:
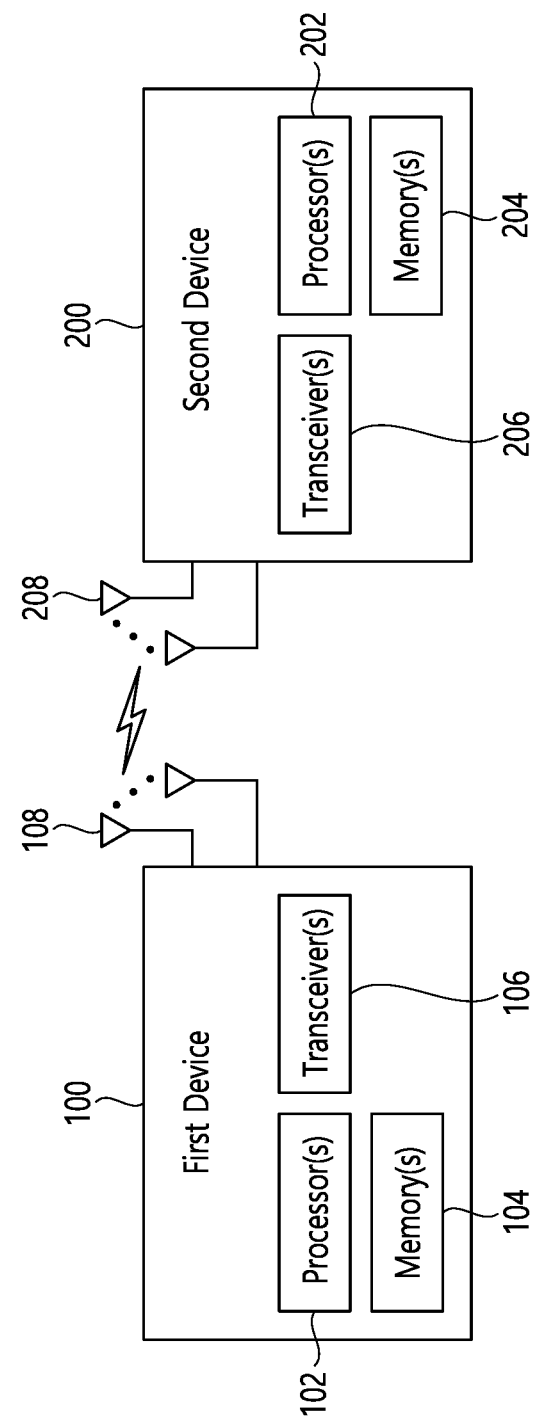
FIG. 21 shows wireless devices, based on an embodiment of the present disclosure.

FIG. 21 shows wireless devices, based on an embodiment of the present disclosure.

Referring to FIG. 21, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 20.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 22:
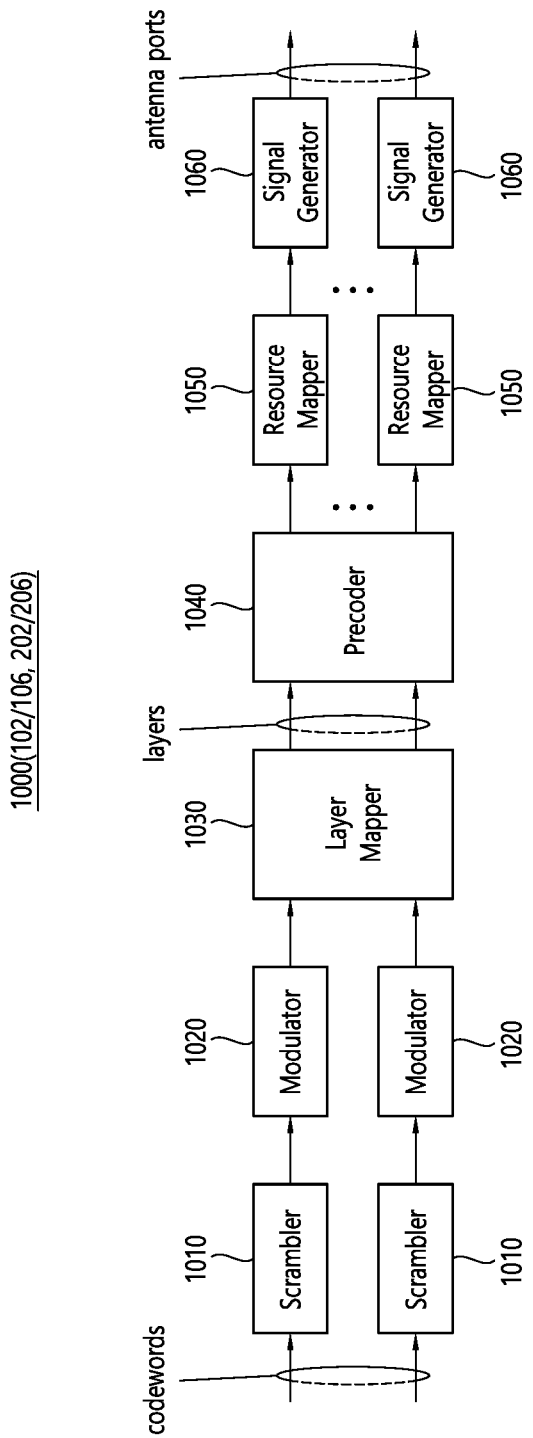
FIG. 22 shows a signal process circuit for a transmission signal, based on an embodiment of the present disclosure.

FIG. 22 shows a signal process circuit for a transmission signal, based on an embodiment of the present disclosure.

Referring to FIG. 22, a signal processing circuit 1000 may include scramblers 1010, modulators 1020, a layer mapper 1030, a precoder 1040, resource mappers 1050, and signal generators 1060. An operation/function of FIG. 22 may be performed, without being limited to, the processors 102 and 202 and/or the transceivers 106 and 206 of FIG. 21. Hardware elements of FIG. 22 may be implemented by the processors 102 and 202 and/or the transceivers 106 and 206 of FIG. 21. For example, blocks 1010 to 1060 may be implemented by the processors 102 and 202 of FIG. 21. Alternatively, the blocks 1010 to 1050 may be implemented by the processors 102 and 202 of FIG. 21 and the block 1060 may be implemented by the transceivers 106 and 206 of FIG. 21.

Codewords may be converted into radio signals via the signal processing circuit 1000 of FIG. 22. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 22. For example, the wireless devices (e.g., 100 and 200 of FIG. 21) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 23:
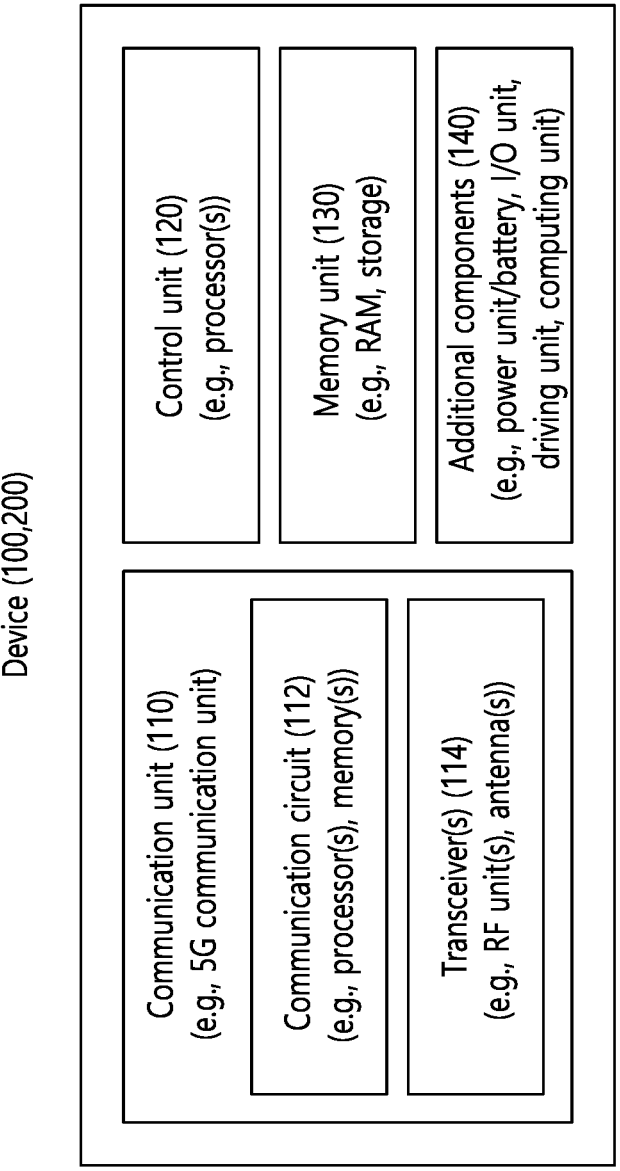
FIG. 23 shows another example of a wireless device, based on an embodiment of the present disclosure.

FIG. 23 shows another example of a wireless device, based on an embodiment of the present disclosure. The wireless device may be implemented in various forms according to a use-case/service (refer to FIG. 20).

Referring to FIG. 23, wireless devices 100 and 200 may correspond to the wireless devices 100 and 200 of FIG. 21 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 21. For example, the transceiver(s) 114 may include the one or more transceivers 106 and 206 and/or the one or more antennas 108 and 208 of FIG. 21. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 20), the vehicles (100b-1 and 100b-2 of FIG. 20), the XR device (100c of FIG. 20), the hand-held device (100d of FIG. 20), the home appliance (100e of FIG. 20), the IoT device (100f of FIG. 20), a digital broadcast terminal, a hologram device, a public safety device, an MTC device, a medicine device, a fintech device (or a finance device), a security device, a climate/environment device, the AI server/device (400 of FIG. 20), the BSs (200 of FIG. 20), a network node, etc. The wireless device may be used in a mobile or fixed place according to a use-example/service.

In FIG. 23, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 23 will be described in detail with reference to the drawings.

Figure 24:
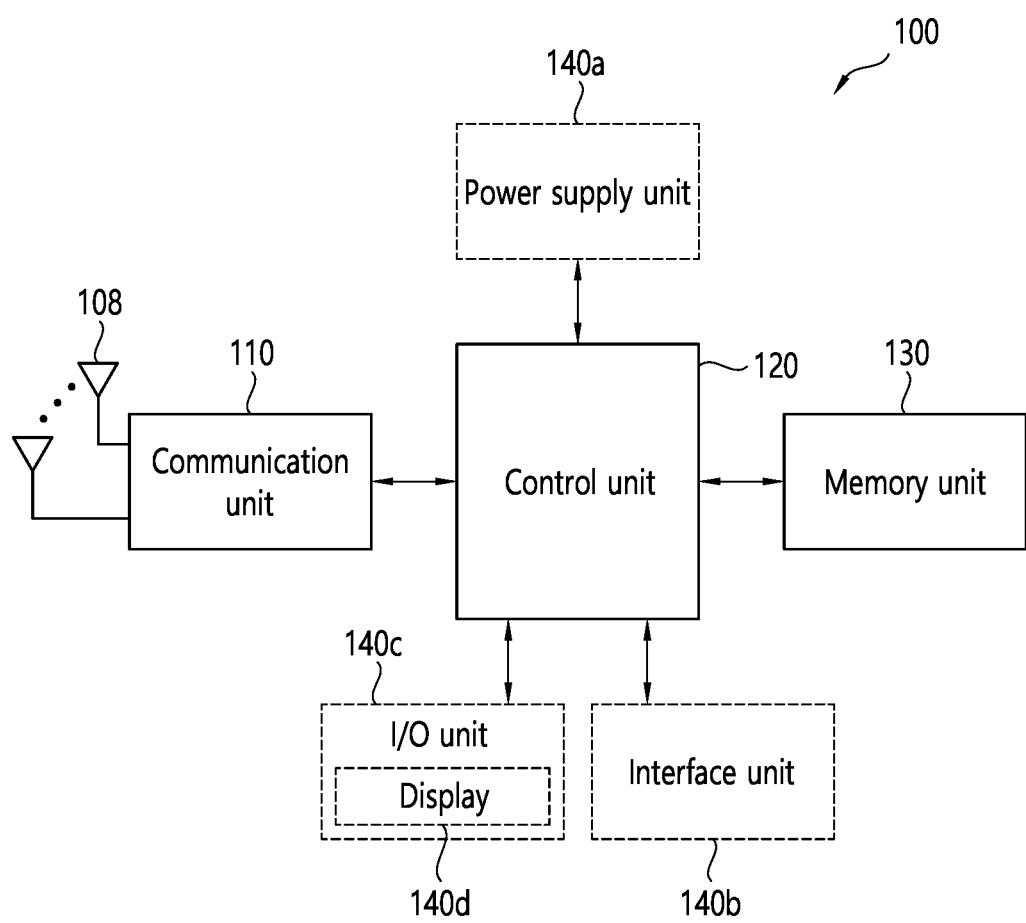
FIG. 24 shows a hand-held device, based on an embodiment of the present disclosure.

FIG. 24 shows a hand-held device, based on an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 24, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 23, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 25:
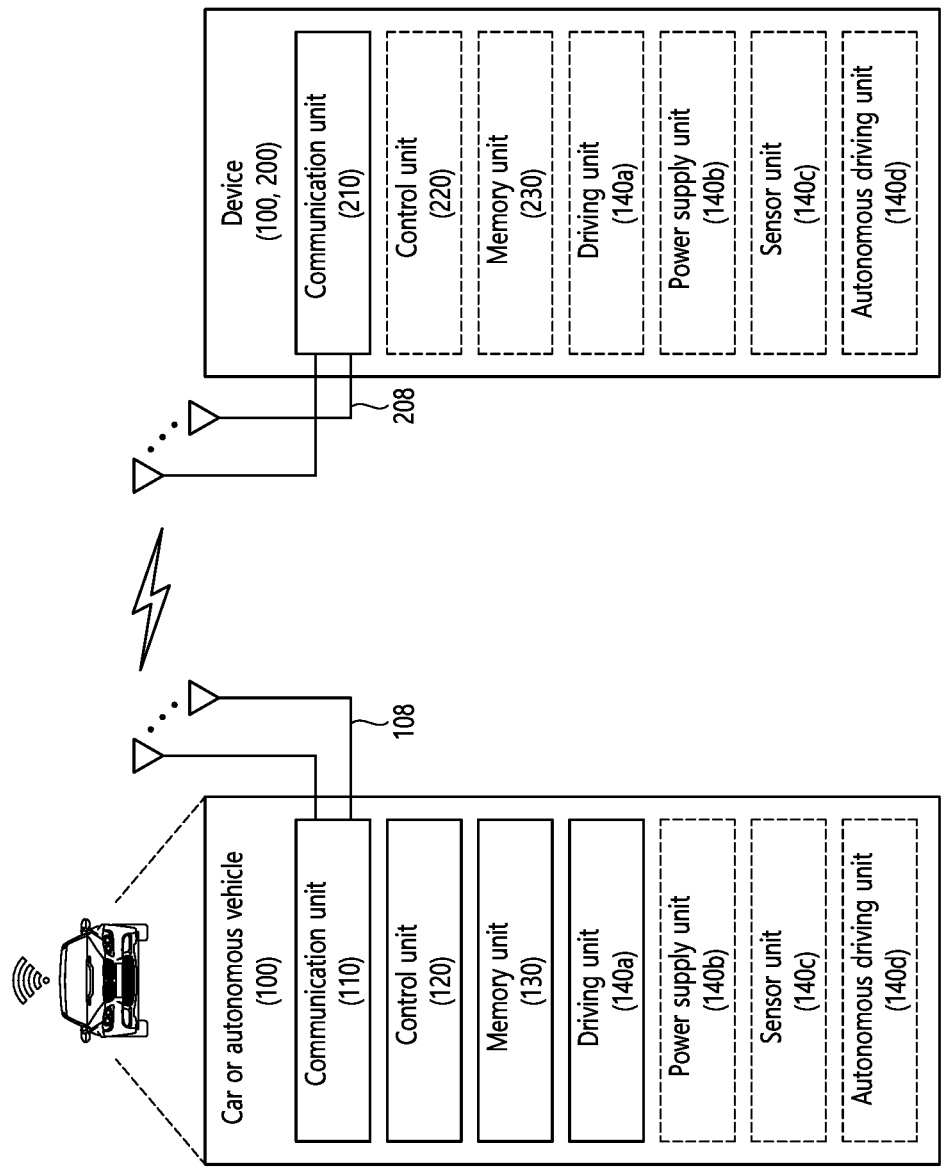
FIG. 25 shows a vehicle or an autonomous vehicle, based on an embodiment of the present disclosure.

FIG. 25 shows a vehicle or an autonomous vehicle, based on an embodiment of the present disclosure. The vehicle or autonomous vehicle may be implemented by a mobile robot, a car, a train, a manned/unmanned Aerial Vehicle (AV), a ship, etc.

Referring to FIG. 25, a vehicle or autonomous vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 23, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140a may cause the vehicle or the autonomous vehicle 100 to drive on a road. The driving unit 140a may include an engine, a motor, a powertrain, a wheel, a brake, a steering device, etc. The power supply unit 140b may supply power to the vehicle or the autonomous vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method comprising:
   receiving, by a first device, from a second device, a first physical sidelink control channel (PSCCH) and a first physical sidelink shared channel (PSSCH) related to the first PSCCH;
   storing, by the first device, first relay data received through the first PSSCH in a first buffer;
   storing, by the first device, data from an upper layer of the first device in a second buffer;
   transmitting, by the first device, to a base station, at least one of a scheduling request (SR) or a buffer status report (BSR) for requesting a grant for transmission of the first relay data, based on the data being available in the second buffer;
   receiving, by the first device, the grant from the base station; and
   transmitting, by the first device, the first relay data in the first buffer based on the grant.

2. The method of claim 1, further comprising:
   receiving, by the first device, from a third device, a second PSCCH and a second PSSCH related to the second PSCCH; and
   storing, by the first device, second relay data received through the second PSCCH and the second PSSCH related to the second PSCCH in a third buffer.

3. The method of claim 2, wherein an SR and a BSR related to the third buffer are not transmitted based on no available data in the third buffer.

4. The method of claim 2, further comprising:
   transmitting, by the first device, to the base station, at least one of an SR or a BSR related to the third buffer, based on available data in the third buffer.

5. The method of claim 4, wherein the SR or the BSR for requesting the grant for transmission of the first relay data is transmitted preferentially over the SR or the BSR related to the third buffer.

6. The method of claim 5, wherein a priority value included in sidelink control information (SCI) received through the first PSCCH is less than a priority value included in SCI received through the second PSCCH.

7. The method of claim 5, wherein a latency budget related to the first relay data received through the first PSCCH is less than a latency budget related to the second relay data received through the second PSCCH.

8. The method of claim 4, further comprising:
   receiving, by the first device, from the base station, information related to a second resource in response to at least one of the SR or the BSR related to the third buffer.

9. The method of claim 2, further comprising:
   receiving, by the first device, from the second device, a first sidelink radio bearer (SLRB) configuration related to the second device; and
   receiving, by the first device, from the third device, a second SLRB configuration related to the third device.

10. The method of claim 1, wherein the first relay data in the first buffer is transmitted through a third PSCCH and a third PSSCH related to the third PSCCH on a first resource based on the grant.

11. The method of claim 10, wherein SCI and a medium access control (MAC) protocol data unit (PDU) received from the second device through the first PSSCH include a source ID of the second device, and
    wherein a MAC PDU transmitted through the third PSSCH includes the source ID of the second device.

12. The method of claim 1, wherein the first relay data in the first buffer is transmitted to the base station through a physical uplink shared channel (PUSCH) on a first resource based on the grant.

13. The method of claim 12, wherein SCI and a MAC PDU received from the second device through the first PSSCH include a source ID of the second device, and
wherein a MAC PDU transmitted through the PUSCH includes the source ID of the second device.

14. A first device comprising:
at least one transceiver;
at least one processor; and
at least one memory connected to the at least one processor and storing instructions that, based on being executed, cause the first device to perform operations comprising:
receiving, from a second device, a first physical sidelink control channel (PSCCH) and a first physical sidelink shared channel (PSSCH) related to the first PSCCH;
storing, first relay data received through the first PSSCH in a first buffer;
storing, data from an upper layer of the first device in a second buffer;
transmitting, to a base station, at least one of a scheduling request (SR) or a buffer status report (BSR) for requesting a grant for transmission of the first relay data, based on the data being available in the second buffer;
receiving, the grant from the base station; and
transmitting, the first relay data in the first buffer based on the grant.

15. An apparatus adapted to control a first device performing wireless communication, the apparatus comprising:
at least one processor; and
at least one memory connected to the at least one processor and storing instructions that, based on being executed, cause the first device to perform operations comprising:
receiving, from a second device, a first physical sidelink control channel (PSCCH) and a first physical sidelink shared channel (PSSCH) related to the first PSCCH;
storing, first relay data received through the first PSSCH in a first buffer;
storing, data from an upper layer of the first device in a second buffer;
transmitting, to a base station, at least one of a scheduling request (SR) or a buffer status report (BSR) for requesting a grant for transmission of the first relay data, based on the data being available in the second buffer;
receiving, the grant from the base station; and
transmitting, the first relay data in the first buffer based on the grant.

* * * * *